US011755527B2

(12) United States Patent
Tamir et al.

(10) Patent No.: US 11,755,527 B2
(45) Date of Patent: *Sep. 12, 2023

(54) TECHNIQUES FOR COMMAND VALIDATION FOR ACCESS TO A STORAGE DEVICE BY A REMOTE CLIENT

(71) Applicant: Tahoe Research, Ltd., Dublin (IE)

(72) Inventors: Eliezer Tamir, Bait Shemesh (IL); Vadim Makhervaks, Austin, TX (US); Ben-Zion Friedman, Jerusalem (IL); Phil Cayton, Warren, OR (US); Theodore L. Willke, Portland, OR (US)

(73) Assignee: Tahoe Research, Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,433

(22) Filed: Aug. 15, 2022

(65) Prior Publication Data

US 2023/0185759 A1   Jun. 15, 2023

Related U.S. Application Data

(63) Continuation of application No. 17/466,371, filed on Sep. 3, 2021, now Pat. No. 11,500,810, which is a continuation of application No. 16/426,685, filed on
(Continued)

(51) Int. Cl.
| G06F 15/173 | (2006.01) |
| G06F 21/44 | (2013.01) |
| G06F 21/79 | (2013.01) |
| H04L 69/12 | (2022.01) |
| G06F 3/06 | (2006.01) |
| G06F 21/80 | (2013.01) |
| G06F 15/167 | (2006.01) |
| H04L 67/1097 | (2022.01) |
| G06F 13/42 | (2006.01) |

(52) U.S. Cl.
CPC .......... *G06F 15/17331* (2013.01); *G06F 3/061* (2013.01); *G06F 3/0611* (2013.01); *G06F 3/0655* (2013.01); *G06F 3/0659* (2013.01); *G06F 3/0683* (2013.01); *G06F 3/0688* (2013.01); *G06F 13/4282* (2013.01); *G06F 15/167* (2013.01); *G06F 21/44* (2013.01); *G06F 21/79* (2013.01); *G06F 21/80* (2013.01); *H04L 67/1097* (2013.01); *H04L 69/12* (2013.01); *G06F 2213/0026* (2013.01); *Y02D 10/00* (2018.01)

(58) Field of Classification Search
CPC ... G06F 15/17331; G06F 3/061; G06F 3/0611; G06F 3/0655; G06F 3/0659; G06F 3/0683
USPC .......................................................... 709/212
See application file for complete search history.

(56) References Cited

U.S. PATENT DOCUMENTS

2004/0205253 A1* 10/2004 Arndt et al. ........ G06F 12/1491
710/1
2006/0074837 A1*  4/2006 Braddy et al. ......... G06F 21/10
(Continued)

*Primary Examiner* — Hermon Asres
(74) *Attorney, Agent, or Firm* — Studebaker & Brackett PC

(57) ABSTRACT

Examples are disclosed for access to a storage device maintained at a server. In some examples, a network input/output device coupled to the server may allocate, in a memory of the server, a buffer, a doorbell, and a queue pair accessible to a client remote to the server. For these examples, the network input/output device may assign an Non-Volatile Memory Express (NVMe) namespace context to the client. For these examples, indications of the allocated buffer, doorbell, queue pair, and namespace context may be transmitted to the client. Other examples are described and claimed.

24 Claims, 16 Drawing Sheets

Related U.S. Application Data

(63) May 30, 2019, now Pat. No. 11,138,143, which is a continuation of application No. 13/997,996, filed as application No. PCT/US2013/021759 on Jan. 16, 2013, now Pat. No. 10,360,176.

(60) Provisional application No. 61/587,541, filed on Jan. 17, 2012.

(56) References Cited

U.S. PATENT DOCUMENTS

| | | | | |
|---|---|---|---|---|
| 2009/0024714 A1* | 1/2009 | Raisch et al. | ........ | H04L 69/161 709/212 |
| 2009/0292861 A1* | 11/2009 | Kanevsky et al. | ..... | G06F 3/067 710/28 |

* cited by examiner

Namespace Context Index 700

| Namespace Context (NSC) | Client | NVMe Namespace Identifier | Protection Domain | Transaction Context | OpCode(s) | I/O QP | NVMe QP |
|---|---|---|---|---|---|---|---|
| 11 | 310-1 | 401-1 | 11 | TTag 510-1 | W, R, F | 320-1 | 340-1 |
| 21 | 310-1 | 402 | 11 | TTag 510-1 | R | 320-1 | 340-1 |
| 32 | 310-1 | 403-2 | 11 | TTag 510-1 | All | 320-1 | 340-1 |
| 12 | 310-2 | 401-2 | 22 | TTag 510-2 | R, WU | 320-2 | 340-2 |
| 22 | 310-2 | 402 | 22 | TTag 510-2 | R | 320-2 | 340-2 |
| 33 | 310-2 | 403-3 | 22 | TTag 510-2 | R, C | 320-2 | 340-2 |
| 13 | 310-3 | 401-3 | 33 | TTag 510-2 | All | 320-3 | 340-3 |
| 33 | 310-3 | 403 | 33 | TTag 510-2 | All | 320-3 | 340-3 |
| 10 | 310-n | 401 | 44 | TTag 510-3 | R | 320-n | 340-n |
| 20 | 310-n | 402 | 44 | TTag 510-3 | R | 320-n | 340-n |
| 31 | 310-n | 403-1 | 44 | TTag 510-3 | R | 320-n | 340-n |

*FIG. 7*

Read Command Format 900

| Byte Offset | [Bit Range] Field Name | |
|---|---|---|
| 0 | [63:32] NVMe Namespace Context (NSC) | [31:16] Command Identifier |
| | | [15:10] RSVD |
| | | [9:8] RSVD(Fuse) |
| | | [7:0] Opcode |
| 8 | [63:0] RSVD | |
| 16 | [63:0] Metadata Pointer | |
| 24 | [63:0] Client Buffer STag | [31:0] Bounce Buffer TTag |
| 32 | [63:0] Client Buffer TO | |
| 40 | [63:0] Starting LBA | |
| 48 | [63:16] RSVD | [15:0] Number of Logical Blocks |
| 56 | [63:0] RSVD | |

*FIG. 9*

Write and Compare Command Format 1000

| Byte Offset | [Bit Range] Field Name | |
|---|---|---|
| 0 | [63:32] NVMe Namespace Context (NSC) | [31:16] Command Identifier<br>[15:10] RSVD<br>[9:8] RSVD(Fuse)<br>[7:0] Opcode |
| 8 | [63:0] RSVD | |
| 16 | [63:0] RSVDr | |
| 24 | [63:0] RSVD | [31:0] Bounce Buffer TTag |
| 32 | [63:0] RSVD | |
| 40 | [63:0] Starting LBA | |
| 48 | [63:16] RSVD | [15:0] Number of Logical Blocks |
| 56 | [63:0] RSVD | |

*FIG. 10*

Flush and Write Uncorrectable Command Format
1100

| Byte Offset | [Bit Range] Field Name | |
|---|---|---|
| 0 | [63:32] NVMe Namespace Context (NSC) | [31:16] Command Identifier |
| | | [15:10] RSVD |
| | | [9:8] RSVD(Fuse) |
| | | [7:0] Opcode |
| 8 | [63:0] RSVD | |
| 16 | [63:0] Metadata Pointer | |
| 24 | [63:0] RSVD | [31:0] Bounce Buffer TTag |
| 32 | [63:0] RSVD | |
| 40 | [63:0] Starting LBA | |
| 48 | [63:16] RSVD | [15:0] Number of Logical Blocks |
| 56 | [63:0] RSVD | |

*FIG. 11*

NVMe Command Completion Format 1200

| Byte Offset | [Bit Range] Field Name |
|---|---|
| 0 | [63:0] RSVD |
| 8 | [63:49] Status Field<br>[48] Phase Tag<br>[47:32] TTag Index Low (Command Identifier)<br>[31:16] RSVD<br>[15:0] Submission Queue Identifier |

FIG. 12

NVMe Command Validation Table 1300

| Check Name | Opcodes | Description |
|---|---|---|
| Transaction Context Valid | All | TTag included in command received from client matches TTag associated/allocated to client |
| Opcode Valid | All | NW I/O device supports Opcode indicated in received command |
| Opcode Enabled | Flush<br>Write Uncorrectable<br>Compare | Opcode enabled for access by client to the storage device |
| Fuse | All | Must be clear |
| Namespace access check | All | Namespace Identifier should match Namespace Protection Domain of the queue pair for the NVMe controller |
| Data access Base and Bounds Check | Write<br>Read<br>Compare | Command does not exceed a bounce buffer portion allocated for the transaction context indicated in the received command |
| TTag and Protection Domain Validation | Write<br>Read<br>Compare | Validate that upper 16 bits of TTag match TTag associated with client |
| Out-of-Line Metadata Base and Bounds checks | Write<br>Read<br>Compare | Should not exceed a metadata area size for a given Transaction Context |
| Namespace identifier valid | Write<br>Read<br>Compare<br>Write Uncorrectable | Namespace identifier allocated to client |
| Namespace Based and Bounds check | Write<br>Read<br>Compare<br>Write Uncorrectable | Determine whether the entire command range fits within allocated queue pair boundaries allocated to client |
| Namespace Opcode Access check | All | Validate that Opcode is enabled for the Namespace identifier associated with the client |

```
RECEIVE A COMMAND FROM A CLIENT TO PROVIDE THE
CLIENT ACCESS TO A STORAGE DEVICE CONTROLLED BY AN
NVME CONTROLLER MAINTAINED AT A SERVER
1502
```

```
VALIDATE THE COMMAND BASED, AT LEAST IN PART, ON
WHETHER AN OPCODE INCLUDED IN THE COMMAND IS
SUPPORTED BY THE NETWORK I/O DEVICE AND ON
WHETHER AN INDEX IDENTIFIER INCLUDED IN THE
COMMAND ASSOCIATES THE CLIENT WITH AN NVME
NAMESPACE IDENTIFIER ALLOCATED TO THE CLIENT
1504
```

```
INDICATE A STATUS OF THE RECEIVED COMMAND TO THE
CLIENT, THE STATUS TO INCLUDE ONE OF AN INVALID
COMMAND OR A COMPLETED COMMAND
1506
```

*FIG. 15*

TECHNIQUES FOR COMMAND VALIDATION FOR ACCESS TO A STORAGE DEVICE BY A REMOTE CLIENT

CROSS-REFERENCE TO RELATED APPLICATIONS

This application is a continuation of, claims the benefit of and priority to previously filed U.S. Pat. Application Serial Number 17/466,371 filed Sep. 3, 2021, entitled "TECHNIQUES FOR COMMAND VALIDATION FOR ACCESS TO A STORAGE DEVICE BY A REMOTE CLIENT", which claims the benefit of and priority to previously filed U.S. Pat. Application Serial No. 16/426,685 filed May 30, 2019, entitled "TECHNIQUES FOR COMMAND VALIDATION FOR ACCESS TO A STORAGE DEVICE BY A REMOTE CLIENT", which is a continuation of, claims the benefit of and priority to previously filed U.S. Pat. Application Serial No. 13/997,996 filed Jun. 25, 2013, entitled "Techniques for Command Validation for Access to a Storage Device by a Remote Client", which is a national stage application claiming the benefit of and priority to International Application No. PCT/US2013/021759 entitled "TECHNIQUES FOR COMMAND VALIDATION FOR ACCESS TO A STORAGE DEVICE BY A REMOTE CLIENT" filed Jan. 16, 2013, which claims priority to U.S. Provisional Pat. Application No. 61/587,541, filed on Jan. 17, 2012, entitled "TECHNIQUES FOR REMOTE STORAGE USING CIRCUITRY", which are hereby incorporated by reference in their entireties.

BACKGROUND

In an example conventional computing arrangement, a client and a server include respective network interface controllers (NICs) or network (NW) input/output (I/O) devices that are capable of communicating with each other using a Remote Direct Memory Access (RDMA) protocol. The server includes a host processor that executes the server's operating system and associated drivers. The server may also include a storage controller that manages access to storage maintained at or by the server. The client's NW I/O device issues requests to the server's NW I/O device to write data to and read data from the storage maintained by the server. The server's operating system, associated drivers, and host processor process the requests received by the server's NW I/O device, and issues corresponding requests to the storage controller. The storage controller receives and executes these corresponding requests. After executing the corresponding requests, the storage controller issues request completion information (and associated data if data has been read from the storage) to the server's operating system and associated drivers. From this, the server's operating system, associated drivers, and host processor generate corresponding request completion information and associated data, and issue the corresponding request completion information and associated data to the server's NW I/O device. The server's NW I/O device then issues the corresponding request completion information and associated data to the client's NW I/O device.

Thus, in the foregoing conventional arrangement, the server's operating system, associated drivers, and host processor process requests received by the server's NW I/O device, and the completion information and data from the storage. This may consume substantial amounts of operating system and host processor processing bandwidth. It may also increase the amount of energy consumed and heat dissipated by the host processor. Furthermore, it may increase the latency involved in processing the requests issued by the client's NW I/O device.

BRIEF DESCRIPTION OF THE DRAWINGS

FIG. 7 illustrates an example Namespace context index.
FIG. 9 illustrates an example read command format.
FIG. 10 illustrates an example write and compare command format.
FIG. 11 illustrates an example flush and write uncorrectable command format.
FIG. 12 illustrates an example NVMe command completion format.
FIG. 13 illustrates an example NVMe command validation table.
FIG. 15 illustrates an example of a logic flow.

DETAILED DESCRIPTION

Figure 1:
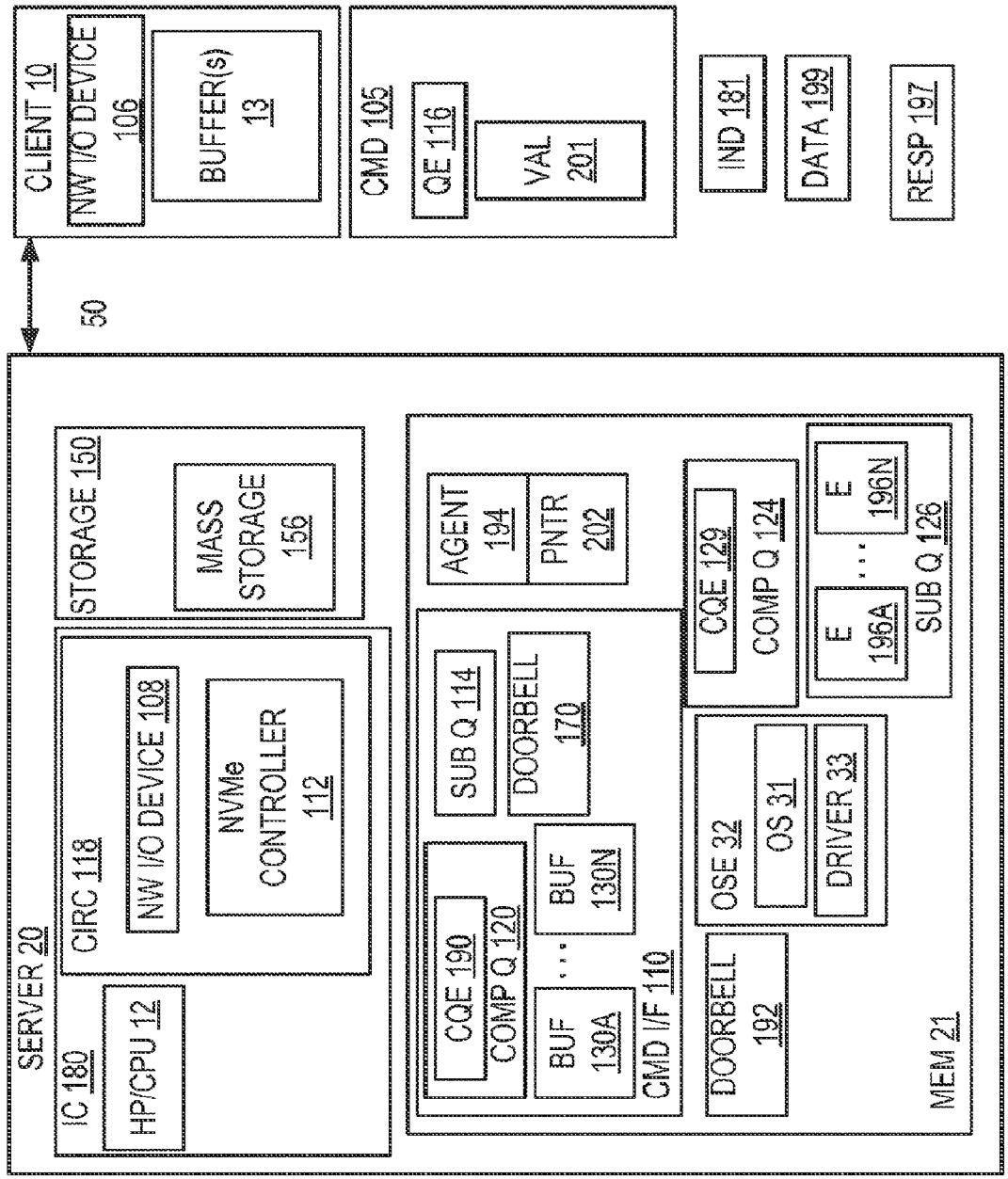
FIG. 1 illustrates a first example system.

As contemplated in the present disclosure, substantial amounts of operating system and host processor processing bandwidth may be consumed in a conventional arrangement between a client and a server when the client attempts to access storage maintained by the server. Recently, servers are including both NW I/O devices and storage controllers having enhanced capabilities that try to minimize operating system and host processor involvement. For example, hardware elements such as command submission and command completion queues may be utilized by a server's NW I/O device and storage controllers to enable a remote client to access storage via a process known as remote direct memory access (RDMA).

Storage controllers are also being designed to operate in compliance with relatively new interconnect communication protocols that may work well with RDMA. Further, these storage controllers may control access to hard disk drives (HDDs) solid state drives (SSDs). The SSDs may include, but are not limited to, various types of non-volatile memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM). In some examples, access to HDDs or SSDs may include use of interconnect communication protocols described in industry standards or specifications (including progenies or variants) such as the Peripheral Component Interconnect (PCI) Express Base Specification, revision 3.0, published in November 2010 ("PCI Express" or "PCIe") and/or the Non-Volatile Memory Express (NVMe) Specification, revision 1.1, published in October 2012.

Storage controllers that operate in compliance with the NVMe Specification ("NVMe controllers") may be capable of minimizing operating system and host processor involvement when allowing a remote client to access storage such as an SSD or an HDD. These types of NVMe controllers may not have built-in security checks to control access to the SSD or the HDD by the client. Typically, access checks are handled by the operating system and this may defeat or reduce possible efficiencies gained through an RDMA process. However, NW I/O devices may have built-in security checks and may have a capability to validate a client to make sure requests for access to the SSD by the client are permitted or are valid. It is with respect to these and other challenges that the examples described herein are needed.

In some examples, techniques associated with command validation for access to a storage device by a remote client may be implemented. For these examples, circuitry for a NW I/O device at a server may be capable of supporting one or more modules associated with receiving, validating and indicating a status for a received command for the client to access a storage device controlled by an NVMe controller maintained at the server. For example, a command for the client to access the storage device may be received at the NW I/O device. Features and/or logic executed by the circuitry for the NW I/O device may validate the command based on whether an operation code (Opcode) indicated in the command is supported by the NW I/O device. The command may also be validated based on whether an index identifier indicated in the command associates the client with an NVMe Namspace Identifier allocated to the client. The features and/or logic executed by the circuitry may then indicate a status of the received command to the client as one of an invalid command (e.g., not authorized) or a completed command (e.g., access was granted and command was executed by the NVMe controller).

FIG. 1 illustrates a first example system. As shown in FIG. 1 the first example system includes a system 100 having a client 10 that is communicatively coupled, via network 50, to server 20. According to some examples, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. Although client 10, server 20, and network 50 will be referred to in the singular, it should be understood that each such respective component may comprise a plurality of such respective components without departing from these examples. According to some examples, a "network" may be or comprise any mechanism, instrumentality, modality, and/or portion thereof that permits, facilitates, and/or allows, at least in part, two or more entities to be communicatively coupled together. Also in some examples, a first entity may be "communicatively coupled" to a second entity if the first entity is capable of transmitting to and/or receiving from the second entity one or more commands and/or data. Also, data and information may be used interchangeably, and may be or comprise one or more commands (for example one or more program instructions), and/or one or more such commands may be or comprise data and/or information. Also for these examples, an "instruction" may include data and/or one or more commands.

Client 10 may include remote direct memory access (RDMA)-enabled network interface controller (RNIC) herein referred to as network (NW) I/O device 106 and/or one or more (and in the example shown in FIG. 1, a plurality of) buffers 13.

As shown in FIG. 1, server 20 may include one or more integrated circuit (IC) chips 180, memory 21, and/or storage 150. One or more chips 180 may have circuitry 118 that may include, a NW I/O device such as NW I/O device 108 and/or an NVMe controller 112. Although not shown in FIG. 1, in some examples NW I/O device 108 may be a separately attachable device that couples to server 20 and includes its own circuitry as described further below.

Also as shown in FIG. 1, the one or more chips 180 that may be incorporated within one or more multi-core host processors (HP) and/or central processing units (CPU) 12. Although not shown in the Figures, server 20 also may comprise one or more chipsets or devices to include, but not limited to memory or input/output controller circuitry). NW I/O device 108, NVMe controller 112, and/or HP/CPU 12 may be capable of communicating with each other. Additionally, NW I/O device 108, NVMe controller 112, and/or HP/CPU 12 may be capable of accessing and/or communicating with one or more other components of server 20 (such as, memory 21 and/or storage 150), via one or more such chipsets. In some examples, client 10 and/or NW I/O device 106 may be remote (e.g., geographically remote), at least in part, from server 20 and/or NW I/O device 108.

According to some examples, "circuitry" may comprise, for example, singly or in any combination, analog circuitry, digital circuitry, hardwired circuitry, programmable circuitry, coprocessor circuitry, state machine circuitry, and/or memory that may comprise program instructions that may be executed by programmable circuitry. Also, in some examples, a processor, HP, CPU, processor core (PC), core, and controller each may comprise respective circuitry capable of performing, at least in part, one or more arithmetic and/or logical operations, and/or of executing, at least in part, one or more instructions. An integrated circuit chip may include one or more microelectronic devices, substrates, and/or dies. Although not shown in the FIG. 1, server 20 may have a graphical user interface system that may include, e.g., a respective keyboard, pointing device, and display system that may permit a human user to input commands to, and monitor the operation of, server 20 and/or system 100. Also, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In some examples, storage 150 may include mass storage 156. For these examples, storage 150 may include one or more devices into, and/or from which, data may be stored and/or retrieved, respectively. Also, for these examples, mass storage may include storage capable of non-volatile storage of data. For example, mass storage 156 may include, without limitation, one or more non-volatile electromechanical, magnetic, optical, and/or semiconductor storage devices. These devices may include hard disk drives (HDDs) or solid state drives (SSDs). The SSDs may have non-volatile types of memory such as 3-dimensional crosspoint memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, NVMe controller 112, storage 150 or mass storage 156 may be capable of operating in compliance with the PCIe Specification and/or the NVMe Specification.

One or more machine-readable program instructions may be stored, at least in part, in memory 21. In operation of server 20, these machine-readable instructions may be accessed and executed by one or more host processors 12, NW I/O device 108, and/or NVMe controller 112. When executed by one or more HP 12, these one or more machine-readable instructions may result in one or more operating system environments (OSE) 32 being executed at least in part by one or more HP 12, and becoming resident at least in part in memory 21. Also when these machine-readable instructions are executed by NW I/O device 108 and/or NVMe controller 112, these one or more instructions may result in one or more command interfaces 110 of NVMe controller 112, one or more doorbells 192, one or more pointers 202, one or more agents 194, one or more completion queues 124, and/or one or more submission queues 126 being established and/or executed by NW I/O device 108 and/or NVMe controller 112, and/or becoming resident in memory 21.

According to some examples, one or more OSE 32 may include one or more operating systems (OS) 31 and/or one or more NW I/O device and/or NVMe controller drivers 33. These one or more drivers 33 may be mutually distinct from one or more OS 31, at least in part. Alternatively or additionally, without departing from these examples, one or more respective portions of one or more OS 32 and/or drivers 33 may not be mutually distinct, at least in part, from each other and/or may be included, at least in part, in each other. Likewise, without departing from these examples, circuitry 118, NW I/O device 108, and/or NVMe controller 112 may be distinct from, or alternatively, may be included in the one or more not shown chipsets and/or HP 12. Also without departing from these examples, one or more portions of memory 21 may be included in or maintained at NW I/O device 108, NVMe controller 112, circuitry 118, HP 12, and/or IC 180.

In some examples, a portion or subset of an entity may include all or less than all of the entity. Also, for these examples, a process, thread, daemon, program, driver, operating system, application, kernel, and/or virtual machine monitor each may (1) include, at least in part, and/or (2) result, at least in part, in and/or from, execution of one or more operations and/or program instructions.

According to some examples, a command interface may facilitate, permit, and/or implement, at least in part, exchange, transmission, and/or receipt of data and/or one or more commands. For these examples, a queue, buffer, and/or doorbell may be one or more locations (e.g., specified and/or indicated, at least in part, by one or more addresses) in memory in which data and/or one or more commands may be stored, at least temporarily. Also, a queue element may include data and/or one or more commands to be stored and/or stored in one or more queues, such as, for example, one or more descriptors and/or one or more commands. Additionally, for these examples, a pointer may indicate, address, and/or specify, at least in part, one or more locations and/or one or more items in memory.

In some examples, NW I/O device 106 and NW I/O device 108 may exchange data and/or commands via network 50 in accordance with one or more protocols that may comply and/or be compatible with an RDMA protocol such as Internet Wide Area RDMA protocol (iWARP), Infiniband (IB) protocol, Ethernet protocol, Transmission Control Protocol/Internet Protocol (TCP/IP) protocol and/or RDMA over Converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband™ Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. Many different, additional, and/or other protocols may be used for such data and/or command exchange without departing from these examples (e.g., earlier and/or later-developed versions of the aforesaid, related, and/or other protocols).

According to some examples, circuitry 118 may permit and/or facilitate, at least in part, NW I/O device 106's access, via NW I/O device 108, of one or more command interfaces 110. For example, circuitry 118 may permit and/or facilitate, at least in part, NW I/O device 106 being able to so access one or more command interfaces 110 in a manner that is independent of OSE 32 in server 20. This accessing may include, for example, the writing of at least one queue element (e.g., one or more queue elements (QE) 116) to one or more submission queues 114 in one or more command interfaces 110. This may command NVMe controller 112 to perform, at least in part, one or more operations involving storage 150 and/or mass storage 156 associated with NVMe controller 112. NVMe controller 112 may perform these one or more operations in response, at least in part, to the one or more queue elements 116 (e.g., after and in response, at least in part, to the one or more queue elements 116 being written into one or more submission queues 114). These one or more operations involving storage 150 and/or mass storage 156 may comprise one or more write operations and/or one or more read operations involving, at least in part, storage 150 and/or mass storage 156. For these examples, client 10 thus may be able to access storage 150 and/or mass storage 156 via the one or more read operations and/or one or more write operations executed by NVMe controller 112.

By way of example, in operation of system 100, client 10 and/or NW I/O device 106 may authenticate client 10 and/or NW I/O device 106 to server 20 and/or logic and/or features at NW I/O device 108. This may result in client 10 and/or NW I/O device 106 being granted permission to access, at least in part, devices maintained at or controlled by elements of server 20 (e.g., via NW I/O device 108). Contemporaneously, after, or prior to this, at least in part, NW I/O device 108, NVMe controller 112, one or more agents 194, and/or OSE 32 may generate, establish, and/or maintain, at least in part, in memory 21, one or more interfaces 110 and/or one or more indicators 181 that may indicate, at least in part, where (e.g., one or more locations) in memory 21 one or more interfaces 110 and/or the components thereof may be located. For example, one or more indicators 181 may indicate, at least in part, one or more locations in memory 21 where one or more submission queues 114, one or more completion queues 120, one or more doorbells 170, and/or one or more buffers 130A ... 130N may be located. NW I/O device 108 may provide, via network 50, one or more indicators 181 to NW I/O device 106. Thereafter, NW I/O device 106 may use one or more of the one or more indicators 181 to access one or more command interfaces 110 and/ or one or more components of the one or more command interfaces 110. One or more indicators 181 may be or comprise, at least in part, one or more handles (e.g., assigned to transaction contexts) for one or more regions in memory 21, such as, in this embodiment, one or more service tags (STags) or transaction tags (TTags) that may comply and/ or may be compatible with an RDMA (e.g., iWARP, IB, RoCE) protocol. In some examples, the one or more regions in memory 21 may be included in one or more bounce buffers maintained to facilitate remote access of storage 150 or mass storage 156 by client 10.

After receiving one or more indicators 181, client 10 and/ or NW I/O device 106 may issue one or more commands 105 to server 20, via network 50 and NW I/O device 108, to NVMe controller 112 in a manner that by-passes and/or is independent of the involvement of OSE 32. The one or more commands 105 may command NVMe controller 112 to perform one or more operations involving storage 150 and/or mass storage 156.

According to some examples, one or more commands 105 may comply and/or be compatible with an RDMA (e.g., iWARP, IB, RoCE) protocol. One or more commands 105 may include and/or specify, at least in part, one or more queue elements 116 that may embody and/or indicate, at least in part, the one or more operations involving storage 150 and/or mass storage 156 that are being commanded. Although not shown in FIG. 1, one or more commands 105 may comprise, specify, and/or indicate, at least in part, one or more of the indictors 181 that may indicate one or more locations in one or more submission queues 114 as one or more intended destinations of one or more queue elements 116.

In some examples, one or more queue elements 116 may command that NVMe controller 112 perform one or more write operations involving storage 150 and/or mass storage 156. Therefore, one or more commands 105 also may include and/or specify, at least in part, data 199 to be written, as a result of executing one or more queue elements 116, by NVMe controller 112 to storage 150 and/or mass storage 156. One or more commands 105 may include, specify, and/or indicate, at least in part, one or more of the indicators 181 that may indicate one or more locations of one or more buffers (e.g., buffer(s) 13) to which data 199 is to be written (at least temporarily) to a client 10.

In response, at least in part, to receipt of one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more queue elements 116 and data 199 to one or more submission queues 114 and one or more buffers 130A, respectively. Thus, in effect, by issuing one or more commands 105 to NW I/O device 108, NW I/O device 106 may write one or more queue elements 116 and data 199 to one or more submission queues 114 and one or more buffers 130A, respectively.

One or more commands 105 also may comprise and/or specify one or more values 201 and one or more of the indicators 181 that may indicate one or more locations of one or more doorbells 170 to which one or more values 201 may be written. In response, at least in part, to these one or more values 201 and these one or more of the indicators 181 in one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, the ringing of a doorbell that is associated with an entity may comprise and/or involve, at least in part, the writing one or more values to one or more memory locations (e.g., associated with, comprising, and/or embodying the doorbell) that may result in and/or trigger, at least in part, the entity performing, at least in part, one or more operations and/or actions. In some examples, the doorbells 170 and/or 192 may appear to CPU 12 and/or server 20 as one or more respective memory locations (not shown) in respective memory (not shown) in NVMe controller 112 and/or NW I/O device 108, respectively.

In response, at least in part, to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 may then execute, at least in part, the one or more commands that are specified and/or embodied by one or more queue elements 116. This may result in NVMe controller 112 performing, at least in part, the one or more operations (e.g., one or more writes to storage 150 and/or mass storage 156 of data 199 stored in one or more buffers 130A) involving storage 150 and/or mass storage 156.

After completion, at least in part, of these one or more operations involving storage 150 and/or mass storage 156, NVMe controller 112 may generate and write, at least in part, one or more completion queue elements (CQE) 129 to one or more completion queues 124. Also after completion, at least in part, of these one or more operations involving storage 150 and/or mass storage 156, NVMe controller 112 also may write, at least in part, one or more values to one or more doorbells 192 associated with NW I/O device 108. This may ring one or more doorbells 192. In response, at least in part, to the ringing of one or more doorbells 192, NW I/O device 108 may write (e.g., via one or more RDMA write operations) one or more completion queue elements 190 to one or more completion queues 120 and then forward the one or more completion queue elements 190 to one or more buffers 13 in client 10 (e.g., via one or more responses 197).

After one or more (e.g., several) such write and/or read operations involving storage 150 and/or mass storage 156 have been performed, at least in part, one or more agents 194 may carry out certain management functions. For example, one or more agents 194 may establish, at least in part, one or more submission queue entries/elements (E) 196A ... 196N in one or more submission queues 126 associated with NW I/O device 108 and/or one or more submission queue entries/elements QE A ... QE N in table 250 (see FIG. 2). As is discussed below, these elements 196A ... 196N and/or QE A ... QE N, when executed, at least in part, by NW I/O device 108, may permit and/or facilitate copying or forwarding, at least in part, of one or more other queue entries (e.g., one or more NVMe controller 112 completion entries 190) to client 10 and/or NW I/O device 106 and/or data read by NVMe controller 112.

These management functions also may include the updating (e.g., appropriately advancing), at least in part, by one or more agents 194 of one or more pointers (e.g., ring pointers PNTR 202) associated with one or more queue pairs (e.g., submission/completion queue pair 114, 120 and/or submission/completion queue pair 126, 124) associated with the NW I/O controller 108 and the NVMe controller 112. This may permit new entries to the queue pairs to be stored at locations that will not result in erroneous overwriting of other entries in the queue pairs. Additionally, as part of these management functions, the one or more agents 194 may indicate one or more of the buffers 130A ... 130N that may be available to be reused.

As another example, one or more queue elements 116 may command that NVMe controller 112 perform one or more read operations involving storage 150 and/or mass storage 156. Therefore, one or more commands 105 also may include and/or specify, at least in part, one or more locations (e.g., Namespaces) in storage 150 and/or mass storage 156 from which NVMe controller 112 is to read data 199, as a result of executing one or more queue elements 116.

In response, at least in part, to receipt of one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more queue elements 116 to one or more submission queues 114. Thus, in effect, by issuing one or more commands 105 to NW I/O device 108, NW I/O device 106 may write one or more queue elements 116 to one or more submission queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response, at least in part, to these one or more values 201 and these one or more of the indicators 181 in one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

In response, at least in part, to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 then may execute, at least in part, the one or more commands that are specified and/or embodied by one or more queue elements 116. This may result in NVMe controller 112 performing, at least in part, the one or more operations (e.g., one or more reads of storage 150 and/or mass storage 156 to obtain data 199) involving storage 150 and/or mass storage 156 and storing data 199 in one or more buffers (e.g., one or more buffers 130A).

After completion, at least in part, of these one or more operations involving storage 150 and/or mass storage 156, NVMe controller 112 may generate and write, at least in part, one or more completion queue elements 129 to one or more completion queues 124. Also after completion, at least in part, of these one or more operations involving storage 150 and/or mass storage 156, NVMe controller 112 also may write, at least in part, one or more values to one or more doorbells 192 associated with NW I/O device 108. This may ring one or more doorbells 192. In response, at least in part, to the ringing of one or more doorbells 192, NW I/O device 108 may obtain queue elements 129 from the one or more completion queues 124 and forward or write one or more completion queue elements 190 to one or more completion queues 120 to facilitate the transfer of data 199 (e.g., via one or more RDMA write operations with NW I/O device 106) to one or more buffers 13 in client 10 (e.g., via one or more responses 197).

According to some examples, command interface 110 may be asynchronous in that, for example, completion queue elements may not be stored in an order in one or more completion queues 120 that corresponds to (1) the order in which command queue elements are stored in the one or more submission queues 114, (2) the order in which such command queue elements are executed and/or completed by the NVMe controller 112, and/or (3) the order in which completion queue elements 190 are stored in one or more completion queues 120 and/or provided to NW I/O device 106 and/or client 10. In operation, NW I/O device 106 and/or client 10 may appropriately reorder, in the case of write commands issued from the client 10 and/or NW I/O device 106, corresponding completion queue elements 190 received from NW I/O device 108. However, in the case of read commands, in this embodiment, in order to permit respective data read from storage 150 and/or mass storage 156 to be appropriately associated with corresponding completion queue elements for transmission to client 10 and/or NW I/O device 106, each completion queue element (e.g., completion queue element 190) resulting from completion indications placed in completion queues 120 by NW I/O device 108 may include the elements illustrated in FIG. 2.

Figure 2:
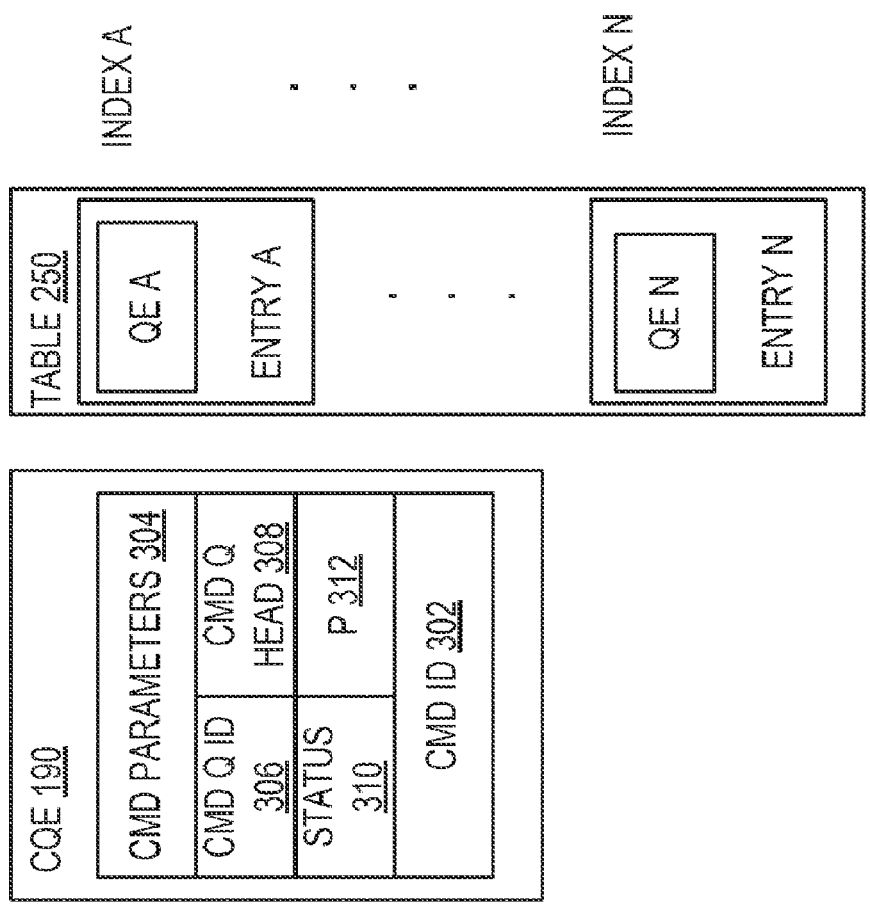
FIG. 2 illustrates an example completion queue element.

As shown in FIG. 2, completion queue element (e.g., completion queue element 190) may include one or more command parameters 304, one or more command queue identifiers 306, one or more command queue head position indicators 308, status information 310, one or more queue phase bit (P) 312, and/or one or more command identifiers 302. One or more command parameters 304 may be and/or indicate one or more command specific parameters of the one or more queue elements 116 and/or commands 105 that may correspond to and/or be associated with the one or more completion queue elements 190. One or more command queue identifiers 306 may indicate and/or specify the one or more submission queues 114 to which the one or more queue elements 116 were written. One or more command queue head position indicators 308 may indicate the current position (e.g., in the one or more submission queues 114 identified by one or more command queue identifiers 306) at which the one or more queue elements 116 may be located. Status information 310 may indicate whether the one or more commands 105 and/or one or more queue elements 116 were successfully performed by the NVMe controller 112. One or more phase bits 312 may indicate whether the one or more completion queue elements 190 constitute the most recently added valid entry (e.g., to service) in one or more completion queues 120. One or more command identifiers 302 may indicate, at least in part, and/or be identical to one or more corresponding command identifiers in the corresponding one or more queue elements 116. Command identifiers 302 may permit one or more completion queue elements 190 to be correctly associated with one or more corresponding queue elements 116 and/or with the respective data 199 read from the storage 150 and/or mass storage 156 as a result of the execution of these one or more corresponding queue elements 116.

In some examples, one or more command identifiers 302 may be selected so as not to collide with and/or be identical to any other command identifiers that may be currently used by any completion queue elements that have not yet been provided to client 10 and/or NW I/O device 106 by NW I/O device 108. The command identifiers that may be used in system 100 may be pre-calculated and/or pre-generated, and may be used as respective indices INDEX A ... INDEX N for respective entries ENTRY A ... ENTRY N in a table 250 that may be stored, at least in part, in memory 21. Each of the entries ENTRY A ... ENTRY N in the table 250 may store one or more respective pre-calculated and/or pre-generated command queue elements QE A ... QE N that may be associated with NW I/O device 108. Each respective element QE A ... QE N may be associated with one or more respective buffers in one or more buffers 130A ... 130N. Each of the buffers in one or more buffers 130A ... 130N into which NVMe controller 112 may store data read from storage 150 and/or mass storage 156 also may be associated with one or more respective submission identifiers used in system 100 and/or respective entries Entry A Entry N The command queue elements QE A ... QE N may be stored and/or maintained in table 250 by client 10 and/or one or more agents 194. If one or more buffers 130A ... 130N are statically allocated, table 250 may be static, and may correspond in terms of, for example, allocation characteristics to one or more buffers 13 that may be allocated in the client 10.

By way of example, after NVMe controller 112 reads data 199 from storage 150 and/or mass storage 156, NVMe controller 112 may store the data 199 in one or more buffers (e.g., one or more buffers 130A) that may be associated with one or more command identifiers 302, and may store one or more queue elements 129 in one or more completion queues 124. In response, at least in part, to NVMe controller 112 ringing one or more doorbells 192, NW I/O device 108 may determine, based at least in part upon one or more queue phase bits 312, the one or more most recently added valid completion queue in one or more completion queues 120 or 124. NW I/O device 108 may use the one or more command identifiers 302 in one or more completion queue elements 190 to index into table 250 to locate the one or more entries (e.g., one or more entries ENTRY A) and one or more command queue elements (e.g., one or more queue elements QE A) in table 250 that may be associated with and/or identified, at least in part, by one or more command identifiers 302. NW I/O device 108 may execute, at least in part, one or more commands that may be associated with and/or embodied by these one or more command queue elements QE A. This may result, at least in part, in NW I/O 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

Alternatively, in some examples, NW I/O device 108 may comprise, at least in part, a state machine (not shown). This state machine may be independent and/or separate from, at least in part, of one or more submission queues 126 that may be associated with and/or utilized by NW I/O device 108. This state machine may locate one or more command queue elements QE A in table 250 based at least in part upon one or more command identifiers 302, and may copy the one or more queue elements QE A into one or more corresponding submission queue elements 196A in one or more submission queues 126. The state machine then may signal NW I/O device 108 to access and execute, at least in part, one or more submission queue elements 196A in one or more submission queues 126.

Further alternatively, without departing from these examples, prior to completing one or more read operations involving storage 150 and/or mass storage 156, NVMe controller 112 may locate and/or select, at least in part, one or more queue elements QE A in and/or from table 250, based at least in part upon one or more command identifiers 302. NVME controller 112 then may write into one or more completion queue elements 190 into one or more completion queues 120, and may write one or more queue elements QE A into one or more corresponding submission queue elements 196A in one or more submission queues 126. NVME controller 112 then may ring one or more doorbells 192. This may result in NW I/O device 108 accessing and executing, at least in part, one or more submission queue elements 196A in one or more submission queues 126. This may result, at least in part, in NW I/O device 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

In this alternative, firmware and/or one or more agents 194 executed, at least in part, by NVMe controller 112 may maintain per-queue-pair context information to indicate one or more queue pairs used for RDMA transactions. This context information also may include various pointers (e.g., to one or more arrays of submission queue elements 196A ... 196N to move data from one or more buffers 130A ... 130N to one or more buffers 13, and/or the head of one or more submission queues 126), one or more locations of one or more doorbells 192 and one or more values to ring the one or more doorbells 192, and/or local copies of head and/or pointers to the one or more submission queues 126. Various of these pointers (e.g., the head and tail pointers) may be dynamically updated by firmware executed by NVMe controller 112.

Additionally or alternatively, without departing from these examples, NW I/O device 108 and/or NVMe controller 112 may be comprised, at least in part, in the not shown chipset, or in a not shown circuit board or device. Also additionally or alternatively, without departing from this embodiment, storage 150 and/or mass storage 156 may be comprised, at least in part, internally in server 20 or be external to server 20.

Further although the foregoing description has been made with reference to NW I/O device 108 being an RNIC, and NVMe controller 112 being an NVMe compliant storage controller, the principles of this embodiment may be applied to circumstances in which protocols other than and/or in addition to RDMA or NVMe may be employed, and/or in which NVMe controller 112 may be involved in executing and/or facilitating operations that do not involve storage 150 (e.g., other and/or additional input/output and/or communication-related operations). Accordingly, without departing from the above mentioned examples, NW I/O device 108 may utilize, and/or communications between client 10 and server 20 may employ, protocols other than and/or in addition to RDMA. Also, without departing from this embodiment, NW I/O device 108 or NVMe controller 112 may be involved in executing and/or may facilitate execution of such other and/or additional operations that may employ protocols other than PCIe or NVMe protocols. In these additional and/or alternative arrangements, hardware and/or firmware circuitry (not shown) may be comprised in circuitry 118 that may permit, at least in part, writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, in some examples, circuitry may be arranged, at least in part, to enable a first NW I/O device in a client to access, via a second NW I/O device in a server that is remote from the client and in a manner that is independent of an operating system environment in the server, at least one command interface of another (e.g., storage, and/or another/additional type of) controller of the server. The NW I/O device in the client and the NW I/O device in the server may be or comprise respective remote direct memory access-enabled network interface controllers (e.g., controllers capable, at least in part, of utilizing and/or communicating via RDMA). The command interface may include at least one (e.g., storage, and/or other/additional type of) controller command queue. Such accessing may include writing at least one queue element to the at least one submission queue to command the another controller to perform at least one operation (e.g., involving storage, and/or involving one or more other and/or additional types of operations, such as, other and/or additional input/output operations) associated with the another controller (e.g., an NVMe controller). The another controller may perform the at least one operation in response, at least in part, to the at least one queue element. Many alternatives, variations, and modifications are possible.

Thus, in some examples, the one or more command interfaces 110 of NVMe controller 112 in server 20 may be directly accessed by the client's NW I/O device 106 via one or more RDMA transactions, in a manner that by-passes, is independent of, and/or does not involve the server's OSE 32 and/or CPU 12. Advantageously, this may permit storage commands, data, and completion messages to be communicated between the client and server much more quickly and efficiently, and with reduced latency. Furthermore, in this embodiment, interactions between NW I/O device 108 and NVMe controller 112 may be carried out entirely or almost entirely by hardware (e.g., utilizing peer-to-peer memory and doorbell writes), and also in a manner that by-passes, is independent of, and/or does not involve the server's OSE 32 and/or CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A ... 130N, as a common pool of buffers, between or among the client 10 in carrying out their communications with server 20, NW I/O device 108, and/or NVMe controller 112. In order to permit such buffer sharing, NW I/O device 108 may be capable of manipulating, adjusting, and/or modifying, at least in part, buffer-specifying information that may be indicated, at least in part, in commands 105 provided to the server 20 by the clients 10 in order to allow the buffers 130A ... 130N and/or other server resources to be shared among the clients 10 without resulting in, for example, contention-related issues.

For example, the one or more indicators 181 and/or STags/TTags indicated by the one or more indicators 181 may include respective information that NW I/O device 108 may associate with one or more buffers and/or buffer pools in the buffers 130A ... 130N, instead of and/or in addition to one or more memory region handles. In this arrangement, the clients 10 may perform RDMA read operations utilizing such indicators 181 and NW I/O device 108 may perform write operations to the one or more buffers and/or buffer pools indicated by the respective information and/or indicators 181. In carrying out its operations, NW I/O device 108 may appropriately adjust the actual commands and/or command queue elements provided to NVMe controller 112 in order to result in the correct buffers, etc. being written to by NVMe controller 112 when NVMe controller 112 carries out such commands and/or command queue elements.

Alternatively or additionally, without departing from the above examples, NW I/O device 108 may include and/or be associated with a shared receive queue (not shown) to receive, for example, commands 105 from multiple clients 10. NW I/O device 108 may be capable of substituting, at least in part, one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more STags to the storage controller's command queue and/or doorbell, and writing to these structures may be performed by the server's NW I/O device 108. Advantageously, this may permit multiple clients 10 that may be associated with and/or utilize the shared receive queue to utilize and/or share, at least in part, the same storage controller command queue, doorbell, and/or other structures.

For example, in the case of a write operation, one or more indicators 181, one or more values 201, and/or other information in one or more commands 105 may indicate, at least in part, one or more storage controller STags or TTags for the write operation (and related information), and/or one or more RDMA STags or TTags to one or more buffers to which one or more completion queue elements may be written. Based at least in part upon the one or more received commands 105 and/or other information stored in NW I/O device 108, NW I/O device 108 may select one or more buffers in buffers 130A ... 130N and one or more locations in the submission queue 114 to which to post the data 199 to be written and one or more corresponding command queue elements to NVMe controller 112, respectively. NW I/O device 108 may post the data 199 and the one or more corresponding command queue elements in accordance with such selections, and thereafter, may ring doorbell 170. As posted by NW I/O device 108, the one or more command queue elements may indicate the one or more storage controller STags or TTags supplied in the one or more commands 105, command identifier 302, security context information (e.g., to permit validation of the one or more storage controller STags or TTags), and/or one or more STags/TTags to the one or more buffers to which data 199 has been posted. After NVMe controller 112 has completed, at least in part, the requested one or more write operations and posted one or more completion queue elements, NVMe controller 112 may ring doorbell 192. Based at least in part upon information in table 250, NW I/O device 108 may generate and forward to the one or more clients that provided the received command 105 one or more appropriate responses 197.

In the case of a read operation, generally analogous information may be provided in command 105 and generally analogous operations may be performed by NW I/O device 108 and/or NVMe controller 112. However, in the case of a read operation, the data 199 read by NVMe controller 112 may be stored by NVMe controller 112 to one or more of the buffers 130A ... 130N specified by the NW I/O device 108, and may be read by the NW I/O device 108, instead of vice versa (e.g., as may be the case in a write operation). NW I/O device 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in some examples, advantageously, it may be possible for multiple clients to share the storage controller's command queue, doorbells, and/or the server's buffers, and/or to write to these structures (via the server's NW I/O device) using an RDMA protocol, without suffering from resource contention issues (and/or other disadvantages) that might otherwise occur. The server's NW I/O device may be capable of modifying, at least in part, information associated with and/or comprised in the clients' commands 105 to facilitate such sharing and/or sharing of RDMA STag/TTag information between or among the clients. Advantageously, this may permit RDMA protocol to be employed for command communication and/or completion information between the server and multiple clients, with improved scalability, while reducing the memory consumption to implement such features, and without degradation in communication line rate.

Figure 3:
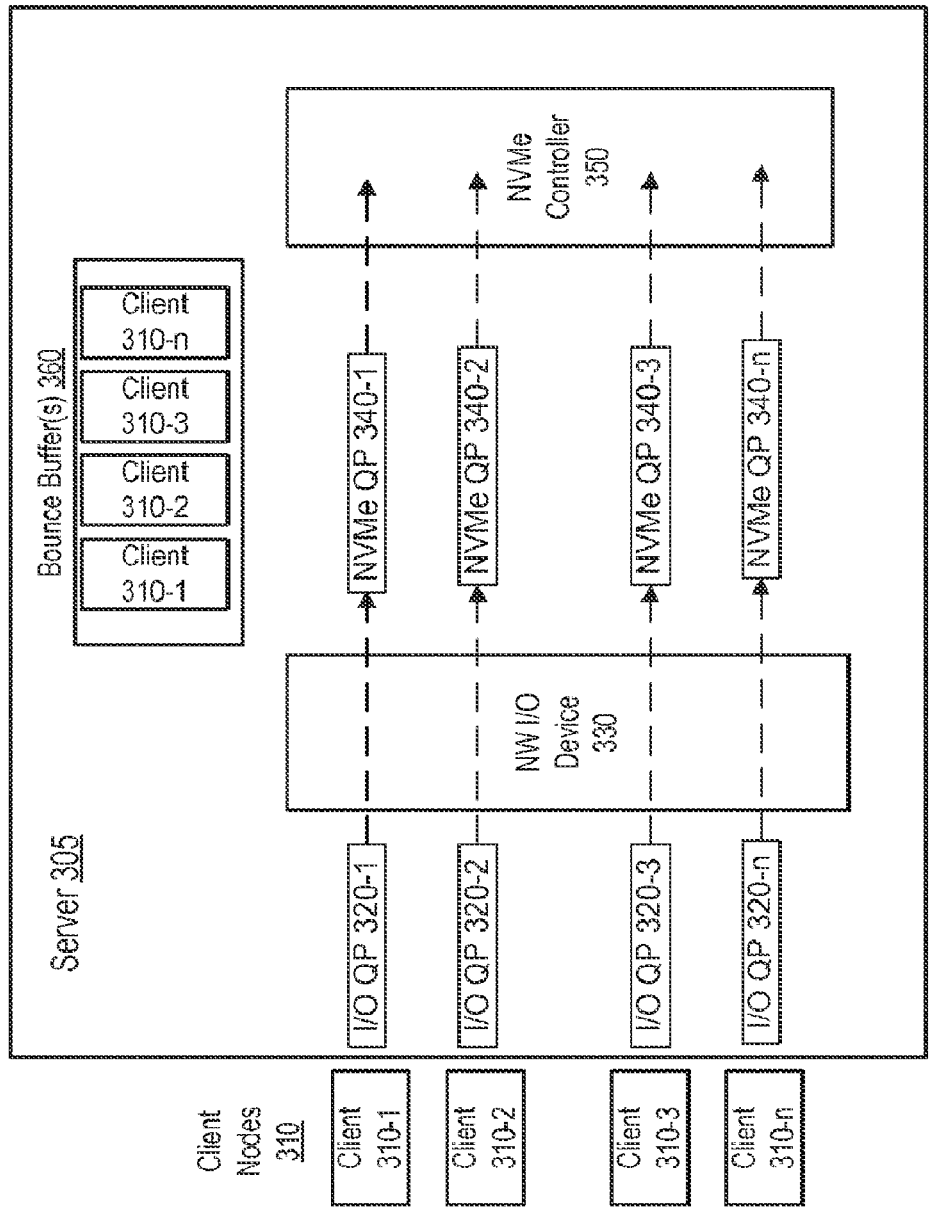
FIG. 3 illustrates a second example system.

FIG. 3 illustrates a second example system. As shown in FIG. 3, the second example system includes a system 300. According to some examples, system 300 may include multiple client nodes 310-1 to 310-$n$ (where "n" represents any positive integer greater than 3) and a server 305. For these examples, a NW I/O device 330, an NVMe controller 350 and bounce buffer(s) 360 may be located with and/or maintained at server 305.

In some examples, logic and/or features executed by circuitry for either network I/O device 330 and/or server 305 may allocate resources to clients 310-1 to 310-$n$ to facilitate remote access to a storage device (not shown) controlled by NVMe controller 350. For these examples, separate I/O queue pairs (QPs) 320-1 to 320-$n$ and separate NVMe QPs 340-1 to 340-$n$ may be allocated or assigned to clients 310-1 to 310-$n$, respectively. Also, at least portions of bounce buffer(s) 360 may be allocated or assigned to clients 310-1 to 310-$n$. I/O QPs 320-1 to 320-$n$, NVME QPs 340-1 to 340-$n$ or bounce buffer(s) 360 may be part of system memory resident at server 305. Alternatively, I/O QPs 320-1 to 320-$n$ may be maintained at or with NW I/O device 330 and NVMe QP 340-1 to 340-$n$ may be maintained at or with NVMe controller 350.

According to some examples, I/O QPs 320-1 to 320-$n$ may separately include both command submission queues and command completion queues utilized by logic and/or features at NW I/O device 330 to exchange information with clients 310-1 to 310-$n$ regarding commands to access the storage controlled by NVMe controller 350. Also, NVMe QPs 340-1 to 340-$n$ may separately include command submission queues and command completion queues utilized by logic and/or features at NW I/O device 330 and at NVMe controller 350 to facilitate the relay of commands from clients 310-1 to 310-$n$ to NVMe controller 350. For these examples, NVMe QPs 340-1 to 340-$n$ are not directly accessible by clients 310-1 to 310-$n$. Since NVMe QPs 340-1 to 340-$n$ are not directly accessible to clients 310-1 to 310-$n$, logic and/or features at NW I/O device 330 may be capable of validating commands received from these clients before they are forwarded or relayed to NVMe QPs 340-1 to 340-1$n$.

In some examples, as described more below, logic and/or features executed by circuitry at NW I/O device 330 may first validate commands received from one or more clients 310-1 to 310-$n$ to access storage controlled by NVMe controller 350. The logic and/or features may then be capable of indicating a status of the received command as either invalid or as completed. As part of this example process, the logic and/or features may utilize I/O QPs 320-1 to 320-$n$, NVMe QP 340-1 to 340-$n$ or bounce buffer(s) 360 to facilitate the access in a similar manner as described above for FIGS. 1 and 2.

Figure 4:
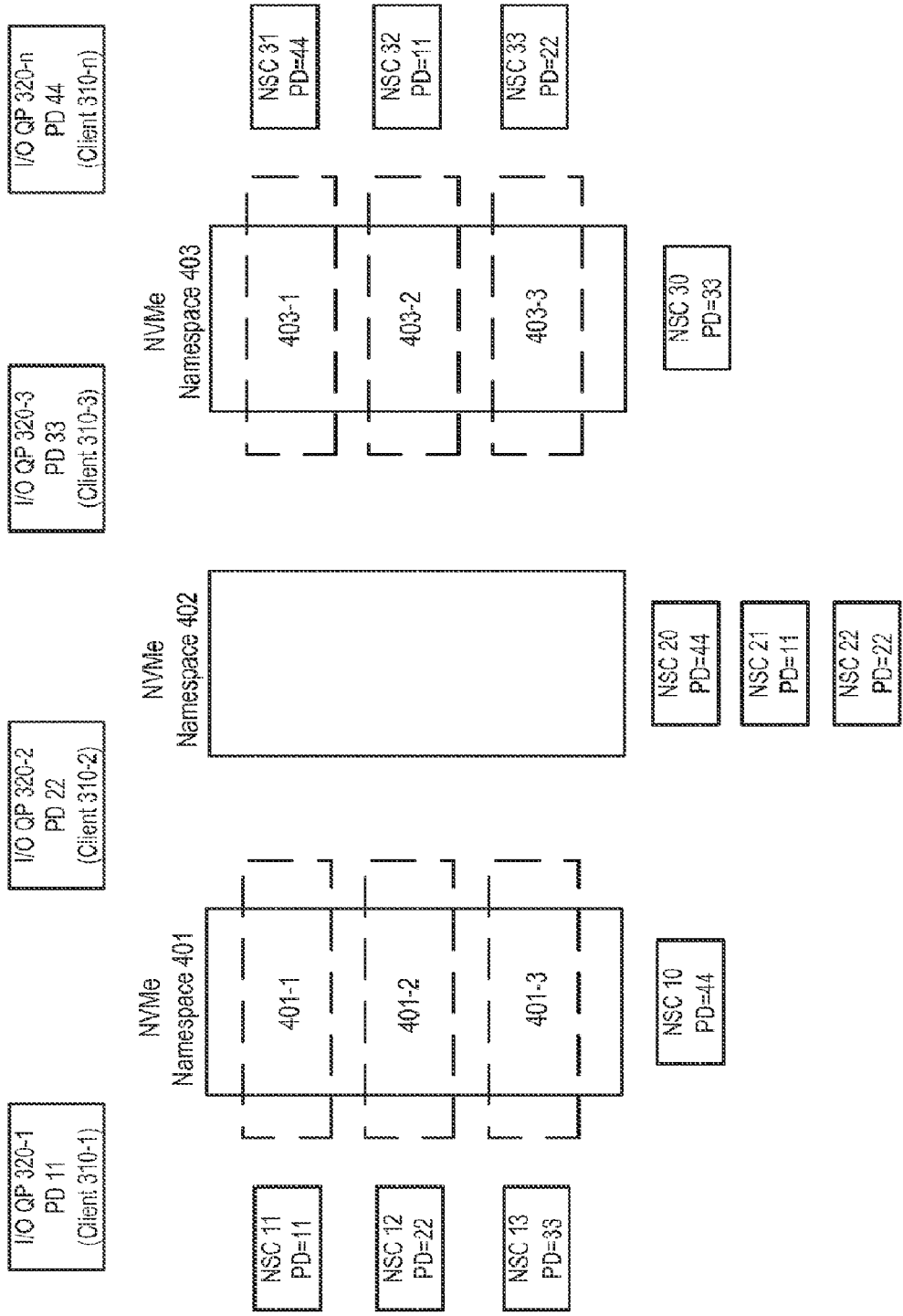
FIG. 4 illustrates an example allocation scheme for NVMe Namespaces.

FIG. 4 illustrates an example allocation scheme 400 for NVMe Namespaces. According to some examples, logic and/or features maintained at server 305 (e.g., server software) may be capable of allocating given NVMe Namespace Identifiers. These given NVMe Namespace Identifiers may then be used by logic and/or features at NW I/O device 330 as part of a validation process to allow RDMA access to at least portions of storage controlled by NVMe controller 350. For these examples, the NVMe Namespace Identifiers may be associated with a quantity of non-volatile memory included in the storage that may be formatted into logical blocks having logical block addresses. As shown in FIG. 4, these NVMe Namespace Identifiers are shown as NVME Namespace 401, 402 and 403. Also, NVMe Namespace 401 is shown as being further sub-divided to include 401-1, 401-2 and 401-3 while NVMe Namespace 403 is shown including 403-1, 403-2 and 403-3.

According to some examples, the logic and/or features maintained at server 305 may assign one or more Namespace contexts (NSCs) to the NVMe Namespace identifiers. For example, as shown in FIG. 4, NSCs 11, 12 and 13 are separately assigned to NVMe Namespace identifiers 401-1, 401-2 and 401-3, respectively. Meanwhile, NSC 10 may be assigned to NVMe Namespace identifier 401. Also, as shown in FIG. 4, NSCs 20, 21 and 22 are each assigned to the same Namespace Identifier 402. As mentioned more below, assigned or allocated NSCs may be communicated to clients 310-1 to 310-$n$ and may then be used as an index identifier by logic and/or features at NW I/O device 330 to determine whether a given NSC included in a command received from a given client associates the given client with an NVMe Namespace that has been allocated to that given client.

In some examples, the logic and/or features at NW I/O device 330 may associate protection domains (PDs) with given I/O QPs. These PDs may provide a client with a protected access to one or more Namespaces having given Namespace Identifiers. For example, PD=11 includes NSC 11, NSC 21 and NSC 32 that may provide protected access to Namespace Identifiers 401-1, 402 and 403-2, respectively. According to some examples, as shown in FIG. 4, PDs 11, 22, 33 and 44 may be associated with I/O QPs 320-1, 320-2, 320-3 and 320-n, respectively. Further, as mentioned above for FIG. 3, I/O QP 320-1 was allocated for use by client 310-1. So by associating PD 11 with I/O QP 320-1, client 310-1 may have protected access to Namespace Identifiers 401-1, 402 and 403-2. The other clients may then have protected access according to the PDs associated with their respectively assigned or allocated I/O QPs.

Figure 5:
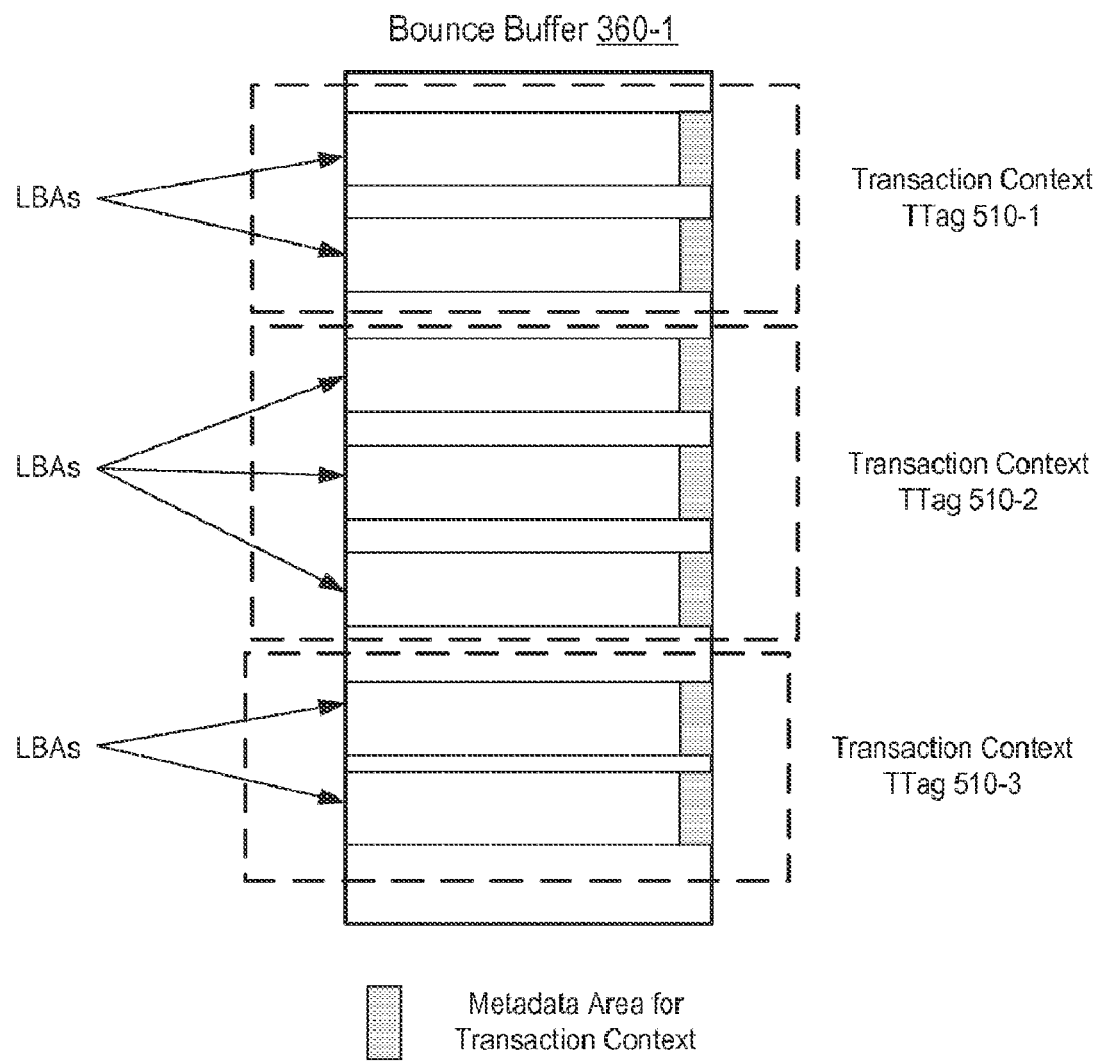
FIG. 5 illustrates a first example bounce buffer allocation.

FIG. 5 illustrates a first example bounce buffer allocation. In some examples, as shown in FIG. 5, logic block addresses (LBAs) of a bounce buffer 360-1 may be assigned or allocated to transaction contexts having transaction tags (TTags) 510-1 to 510-3. For these examples, the LBAs may be for system memory maintained at server 305 and may be assigned by logic and/or features maintained at server 305 (e.g., server software). LBAs assigned to a given transaction context may be used for temporary storage to facilitate data transfers between clients and storage controlled by NVMe controller 350. Also as shown in FIG. 5, metadata areas may be reserved within each of the LBAs allocated to a given transaction context for metadata. The metadata, for example, may be associated with commands for access to the storage controlled by NVMe controller 350 and may include information (e.g., management or control information) associated with data transfers between clients and the storage.

According to some examples, one or more transaction contexts may be allocated to clients 310-1 to 310-n and those allocations communicated by the logic and/or features at server 305 as having TTags 510-1, 510-2 and 510-3 to both the clients and to the logic and/or features at NW I/O device 330. For these examples and as mentioned more below, assigned or allocated TTags may be used by logic and/or features at NW I/O device 330 to possibly validate a command received from a client that includes or references an allocated TTag. Also, the amount of memory capacity included in the LBAs assigned to a given transaction context may limit the amount of data that may be transferred for each command received from the client. If a command includes a request or need for more bounce buffer memory capacity than assigned to a TTag, that command may be deemed as invalid and possibly rejected by logic and/or features at NW I/O device 330.

Figure 6:
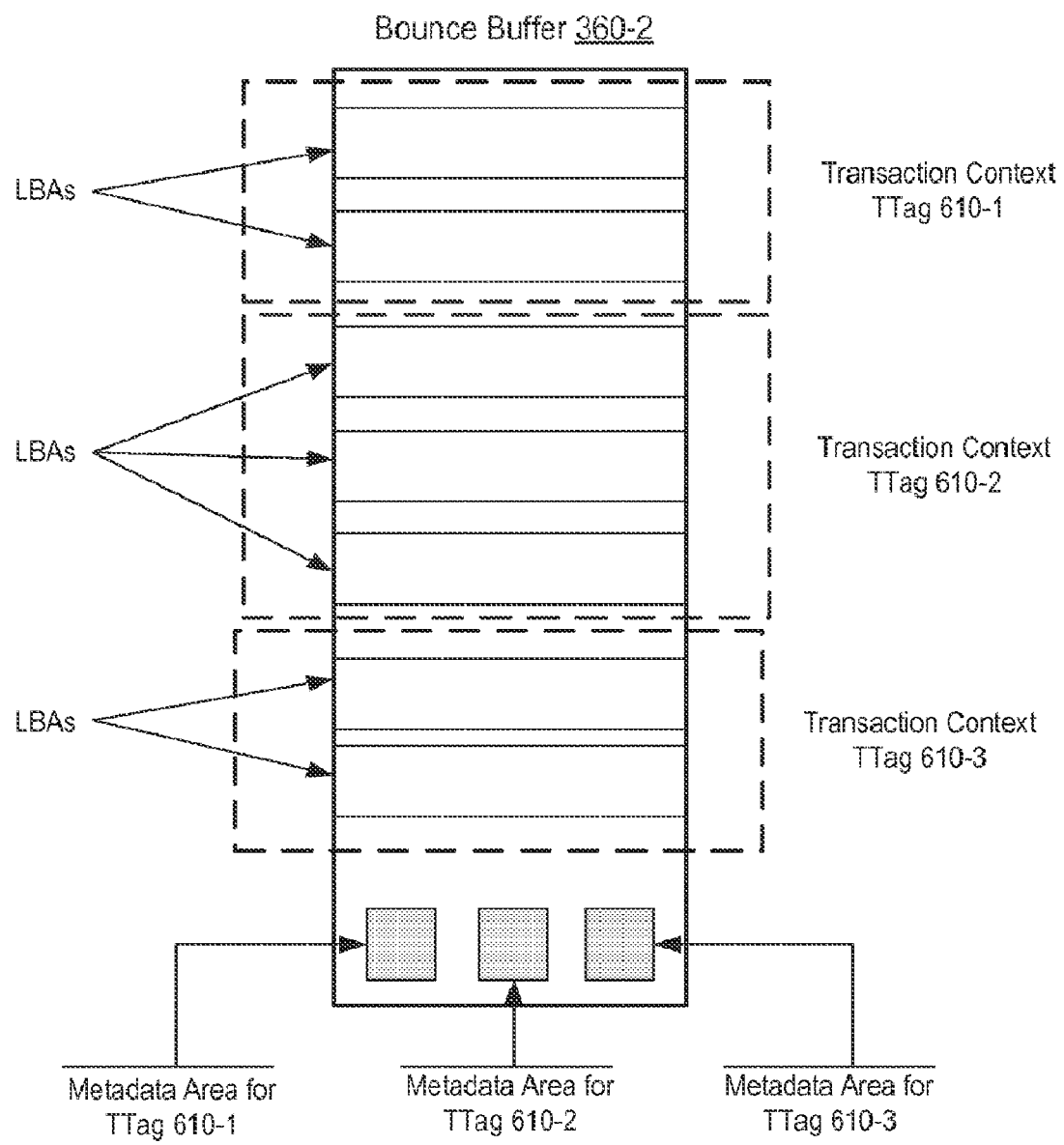
FIG. 6 illustrates a second example bounce buffer allocation.

FIG. 6 illustrates a second example bounce buffer allocation. In some examples, as shown in FIG. 6, LBAs of bounce buffer 360-2 may be assigned or allocated to transaction contexts having TTags 610-1 to 610-3. For these examples, the allocations may be similar to those described for bounce buffer 360-1 with the exception that rather than including metadata with the given LBAs assigned to a give transaction context, a separate metadata area is reserved.

In some examples, an initial command may be received from a client that includes metadata. This initial command may set up a RDMA data transfer between the client and a storage controlled by NVMe controller 350. Subsequent commands may then be received from the clients that do not include metadata. Since the subsequent commands lack metadata, the portion of a bounce buffer allocated to a transaction context may be used entirely for the data transfer rather than reserving a portion for metadata as described above for FIG. 5. Hence, by using the entire portion, bounce buffer 360-2 may be more efficiently used when subsequent commands do not include metadata.

FIG. 7 illustrates an example Namespace context index 700. According to some examples, Namespace context index 700 may include information used to validate a command received from a client to provide the client access to storage controlled by NVMe controller 350. As shown in FIG. 7, Namespace context index 700 depicts the various allocations or assignments of resources provided to clients 310-1 to 310-n described above for FIGS. 3-5. Additionally, Namespace context index 700 includes information to indicate what operational codes (Opcodes) are authorized for the clients to access the storage. These Opcodes for each client may include, but are not limited to, one or more of flush (F), write (W), read (R), write uncorrectable (WU), compare (C).

According to some examples, the Opcodes authorized may also be based on what Opcodes are supported by the logic and/or features at NW I/O device 330 to facilitate RDMA of the storage controlled by NVMe controller 350. For example, the NVME specification includes several Opcodes in addition to the five Opcodes listed above. However the additional Opcodes may be for operations unrelated or unnecessary for RDMA of the storage controlled by NVMe controller 350. Hence, commands including these other Opcodes may be deemed as unsupported by the logic and/or features at NW I/O device 330.

In some examples, certain NVMe Namespace Identifiers may be limited as to the Opcodes allowed for those NVMe Namespace Identifiers. For example, NVMe Namespace Identifier 402 may be limited to only Opcodes for read access. So as shown in FIG. 7 for Namespace context index 700, NSCs 21, 22 and 20 allocated to clients 310-1, 310-2 and 310-n, respectively have only an "R" for Opcode(s). Thus, if commands including these NSCs have Opcodes other than read Opcodes, those commands may not be validated by logic and/or features at NW I/O device 330.

Figure 8:
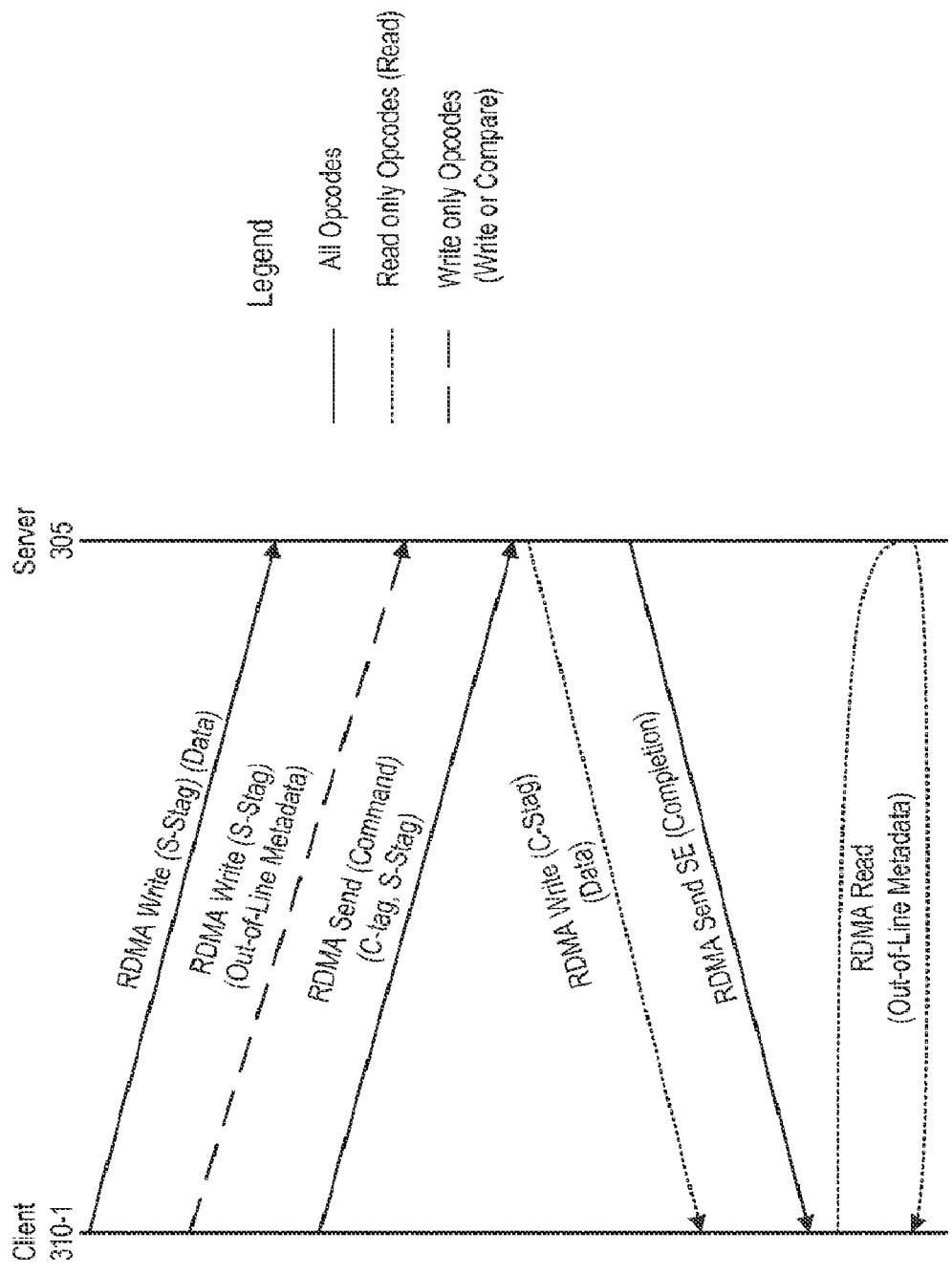
FIG. 8 illustrates an example communication flow.

FIG. 8 illustrates an example communication flow 800. In some examples, as shown in FIG. 8, communication flow 800 depicts example communications between client 310-1 and server 305. For these examples, the communications may be compatible with an RDMA (e.g., iWARP, IB, RoCE) protocol.

In some examples, starting from the top of FIG. 8, the first line "RDMA write (S-Stag) (Data)" may be an RDMA Write message carrying transaction data. The second line "RDMA Write (S-Stag) (Out-of-Line Metadata)" may be an RDMA Write carrying out-of-line Metadata, which may appear when client 310-1 is targeting a Namespace formatted with out-of-line Metadata. The third line "RDMA Send (Command) (C-tag, S-Stag)" may be an RDMA Send message from client 310-1 that may include the command for access to the storage controlled by NVMe controller 350. The fourth line "RDMA Write (C-Stag) (Data)" may be an RDMA write message to carry data from a read of the storage and targeting a buffer (e.g., identified by C-Stag) maintained at client 310-1 that was originally indicated in a read request command. The fifth line "RDMA Send SE (Completion)" may be an RDMA Send message indicating that a solicited event (SE) such as a read command was completed by NVMe controller 350. The last line "RDMA Read (Out-of-Line Metadata)" may be an RDMA Read message used if client 310-1 was targeting a Namespace formatted with an out-of-line Metadata.

According to some examples, as shown in FIG. 8, solid lines may be related to all Opcodes, dotted lines may be related to read only Opcodes and dashed lines may be related to write only Opcodes that may include write or compare commands.

FIG. 9 illustrates an example read command format 900. According to some examples, messages in an RDMA (e.g., iWARP, IB, RoCE) protocol may be sent from remote clients to a server using example read command format 900. For these examples, clients 310-1 to 310-*n* may use example read command format 900 to relay a read command to access storage controlled by NVMe controller 350 at server 305. Logic and/or features at NW I/O device 330 may receive the messages and compare information included in the messages to Namespace context index 700 in order to validate the read command. For example, the command may be validated based at least in part, on whether the "Opcode" indicated in bit range [7:0] is supported by NW I/O device 330 and on whether the "NSC" indicated in bit range [63:32] associates the sending client with an NVMe Namespace Identifier allocated to that client. The "Bounce Buffer TTag" indicated in bit range [31:0] may be compared to information in Namespace context index 700 to validate whether the sending client has been allocated the transaction context associated with that TTag. Further, "Starting LBA" indicated in bit range [63:0] and the "Number of Logical Blocks" indicated in bit range [15:0] may be used to determine the size of an access transaction for the command and then compare that size to the amount of memory capacity from bounce buffer 360-1 that was allocated for the transaction context associated with the "Bounce Buffer TTag". The logic and/or features at NW I/O device 330 may invalidate the read command if the determined size exceeds the amount of memory capacity allocated.

This disclosure is not limited to the above mentioned examples of information included in a read command received in the example format of read command format 900. Other information included in a read command either in the example format of read command format 900 or other read command formats may be used to validate a read command received from a client.

FIG. 10 illustrates an example write and compare command format 1000. According to some examples, messages in an RDMA (e.g., iWARP, IB, RoCE) protocol may be sent from remote clients to a server using write and compare command format 1000. For these examples, clients 310-1 to 310-*n* may use example write and compare command format 1000 to relay a write or a compare command to access storage controlled by NVMe controller 350 at server 305. Logic and/or features at NW I/O device 330 may receive the messages and compare information included in the messages to Namespace context index 700 in order to validate the write or compare command. Information indicated in similar bit ranges as mentioned above for example read command format 900 may also be indicated in example write and compare command format 1000. Thus, write or compare commands received in the example format of write and compare command format 1000 may be validated in a similar manner as mentioned above for FIG. 9.

This disclosure is not limited to the above mentioned examples of information included in a write or compare command received in the example format of write and compare command format 1000. Other information included in a write or compare command either in the example format of write and compare command format 1000 or other write or compare command formats may be used to validate write or compare commands received from a client.

FIG. 11 illustrates an example flush and write uncorrectable command format 1100. According to some examples, messages in an RDMA (e.g., iWARP, IB, RoCE) protocol may be sent from remote clients to a server using flush and write uncorrectable command format 1100. For these examples, clients 310-1 to 310-*n* may use example flush and write uncorrectable command format 1100 to relay a flush or a write uncorrectable command to access storage controlled by NVMe controller 350 at server 305. Logic and/or features at NW I/O device 330 may receive the messages and compare information included in the messages to Namespace context index 700 in order to validate the flush or write uncorrectable command. Information indicated in similar bit ranges as mentioned above for example read command format 900 may also be indicated in example flush and write uncorrectable command format 1100. Thus, flush or write uncorrectable commands received in the example format of flush and write uncorrectable command format 1100 may be validated in a similar manner as mentioned above for FIG. 9.

This disclosure is not limited to the above mentioned examples of information included in a flush or write uncorrectable command received in the example format of flush and write uncorrectable command format 1100. Other information included in a flush or write uncorrectable command either in the example format of flush and write uncorrectable command format 1100 or other flush or write correctable command formats may be used to validate flush or write correctable commands received from a client.

FIG. 12 illustrates an example NVMe command completion format 1200. According to some examples, logic and/or features at NW I/O device 330 may be capable of sending a message in an RDMA (e.g., iWARP, IB, RoCE) protocol to a client to indicate a status of a received command from the client. For these examples, the message may be sent using example NVMe command completion format 1200. The "Status Field" of NVMe command completion format 1200, for example, may indicate in bit range [63:49] the status of the received command. Also, the client may use "TTag Index Low" information included in bit range [47:32] to associate a received command in the example NVMe command completion format 1200 with a previously sent command having a TTag that matches at least some of the information included in bit range [47:32].

FIG. 13 illustrates an example NVMe command validation table 1300. In some examples, NVMe command validation table 1300 may indicate the various validation checks that logic and/or features of NW I/O device 330 may be capable of conducting to verify a command received from a client. As shown in FIG. 13, the checks performed may vary based on the Opcodes indicated or included in the received commands. According to some examples, information included in a received command (e.g., in format 900, 1000 or 1100) may be compared to information maintained in an index such as Namespace context index 700 in order to perform the checks.

Figure 14:
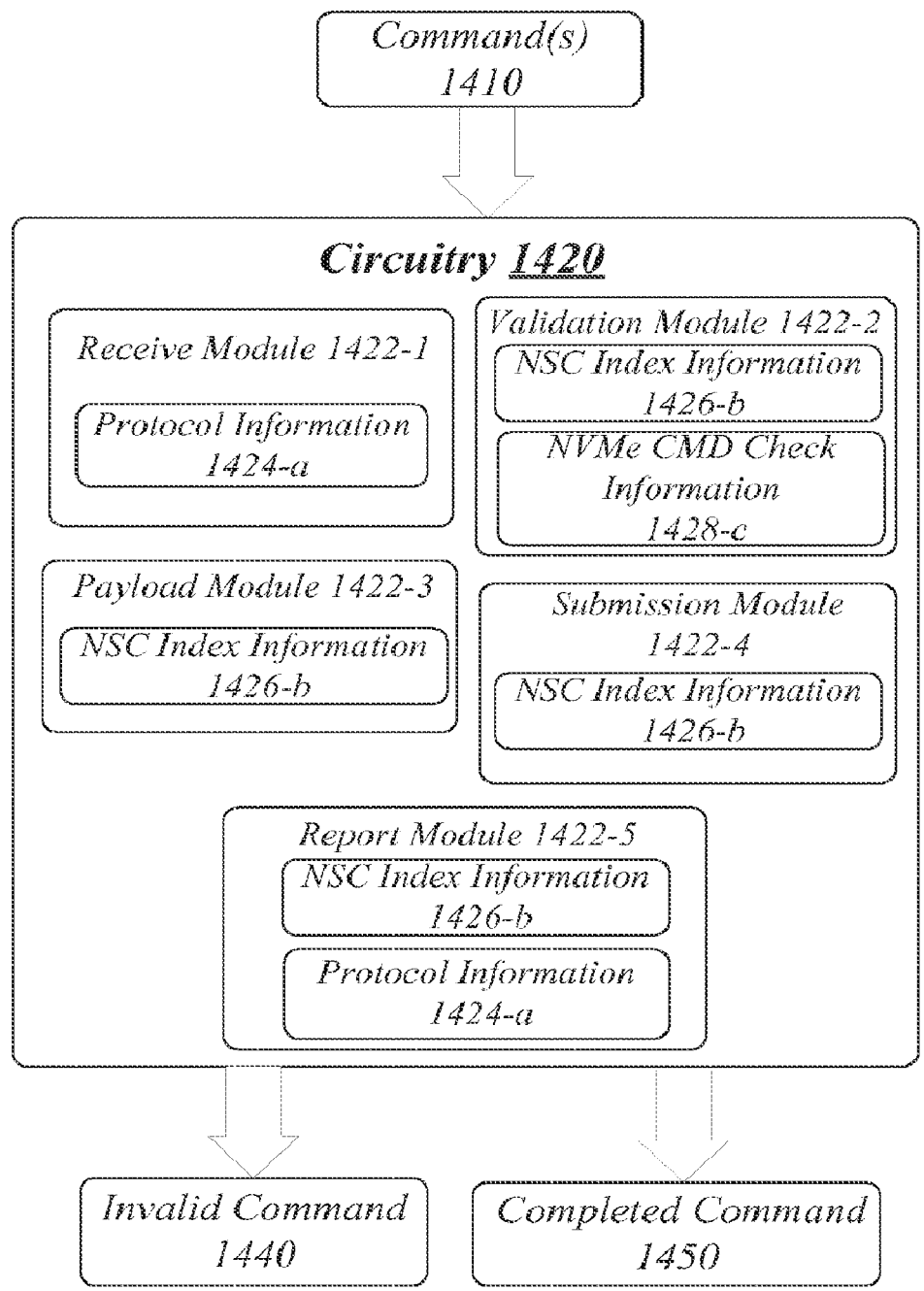
FIG. 14 illustrates an example block diagram for an apparatus.

FIG. 14 illustrates an example block diagram of an apparatus 1400. Although apparatus 1400 shown in FIG. 14 has a limited number of elements in a certain topology, it may be appreciated that the apparatus 1400 may include more or less elements in alternate topologies as desired for a given implementation.

The apparatus 1400 may be supported by circuitry 1420 maintained at a network I/O device coupled to a server. Circuitry 1420 may be arranged to execute one or more software or firmware implemented modules 1422-*a*. It is worthy to note that "a" and "b" and "c" and similar designators as used herein are intended to be variables representing any positive integer. Thus, for example, if an implementation sets a value for a = 5, then a complete set of software or firmware for modules 1422-*a* may include modules 1422-1, 1422-2, 1422-3, 1422-4 or 1422-5. The examples presented are not limited in this context and the different variables used throughout may represent the same or different integer values.

According to some examples, circuitry 1420 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1420 may also be an application specific integrated circuit (ASIC) and at least some modules 1422-*a* may be implemented as hardware elements of the ASIC.

According to some examples, apparatus 1400 may include a receive module 1422-1. Receive module 1422-1 may be capable of receiving commands(s) 1410 via messages in an RDMA compliant (e.g., iWARP, IB, RoCE) protocol. Commands(s) 1410 may have been sent from remote clients to a server. For these examples, the server may be coupled to a NW I/O device having an apparatus 1400. Command(s) 1410 may include commands to access storage controlled by an NVMe controller located at or with the server. Receive module 1422-1 may be capable of at least temporarily storing protocol information 1424-*a* (e.g., in a data structure such as a lookup table (LUT)) in order to interpret or decode at least portions of command(s) 1410.

In some examples, apparatus 1400 may also include a validation module 1422-2. Validation module 1422-2 may be capable of validating command(s) 1410 received by receive module 1422-1. Validation module 1422-2 may use information included in an index (e.g., Namespace context index 700) to perform the validation. Validation module 1422-2 may be capable of at least temporarily storing the index information in a data structure (e.g., an LUT). The index information is shown in FIG. 14 as NSC index information 1426-*b*. Validation module 1422-2 may also perform various validation checks using information at least temporarily stored in the data structure (e.g., NVMe command validation table 1300). The check information is shown in FIG. 14 as NVMe command check information 1428-*c*. For these examples, validation module 1422-2 may perform the validation based, at least in part, on information included in command(s) 1410 as compared to NSC index information 1426-*b* following the checks described in NVMe command check information 1428-*c*.

In some examples, apparatus 1400 may also include a payload module 1422-3. Payload module 1422-3 may be capable of obtaining (e.g., from a LUT maintained by validation module 1422-2) information for placing write or compare data to a bounce buffer indicated in a validated command. Payload module 1422-3 may use information from NSC index information 1426-*b* to determine what LBAs of the bounce buffer to write the data.

According to some examples, apparatus 1400 may also include a submission module 1422-4. Submission module 1422-4 may be capable of writing a validated command to an NVMe submission queue. Submission module 1422-4 may use information from NSC index information 1426-*b* to determine which NVMe submission queue to write the validated command(s) 1410.

In some examples, apparatus 1400 may also include a report module 1422-5. Report module 1422-5 may be capable of indicating a status of the received command(s) 1410. The status, for example, may include invalid command 1440 if the command(s) 1410 were found be invalid. Completed command 1450 may be indicated if validated command(s) 1410 were executed by the NVMe controller. Report module 1422-5 may be capable of at least temporarily storing protocol information 1424-*a* (e.g., in an LUT) in order to encode at least portions of invalid command 1440 or completed command 1450 in an RDMA compliant (e.g., iWARP, IB, RoCE) protocol to be sent to the client that sent command(s) 1410.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 15 illustrates an example of a logic flow 1500. Logic flow 1500 may be representative of some or all of the operations executed by one or more logic, features, or devices described herein, such as apparatus 1400. More particularly, logic flow 1500 may be implemented by receive module 1422-1, validation module 1422-2, payload module 1422-3, submission module 1422-4 or report module 1422-5.

According to some examples, logic flow 1500 at block 1502 may receive a command from a client to provide the client access to a storage device controlled by an NVMe controller maintained at a server. For example, command(s) 1410 may be received by receive module 1422-1 included in an apparatus 1400 for a NW I/O device coupled to the server.

In some examples, logic flow 1500 at block 1504 may then validate the command based, at least in part, on whether an Opcode included in the command is supported by the NW I/O device and on whether an index identifier included in the command associates the client with an NVMe Namespace Identifier allocated to the client. For example, validation module 1422-2 may compare information included in command(s) 1410 to NSC index information 1426-*b* according to NVMe command check information 1428-*c* to determine whether command(s) 1410 are valid.

According to some examples, logic flow 1500 at block 1506 may then indicate a status of the received command to the client. For these examples, the status may include one of an invalid command or a completed command. Report module 1422-5, for example, may indicate invalid command 1440 to the client that sent command(s) 1410 if validation module 1422-2 determined the command was invalid. Alternatively, report module 1422-5 may indicate that valid command(s) 1410 were executed by the NVMe controller maintained at the server. That indication may be completed command 1450 and as mentioned above, may be indicated in a command completion queue assigned to the client that sent command(s) 1410.

Figure 16:
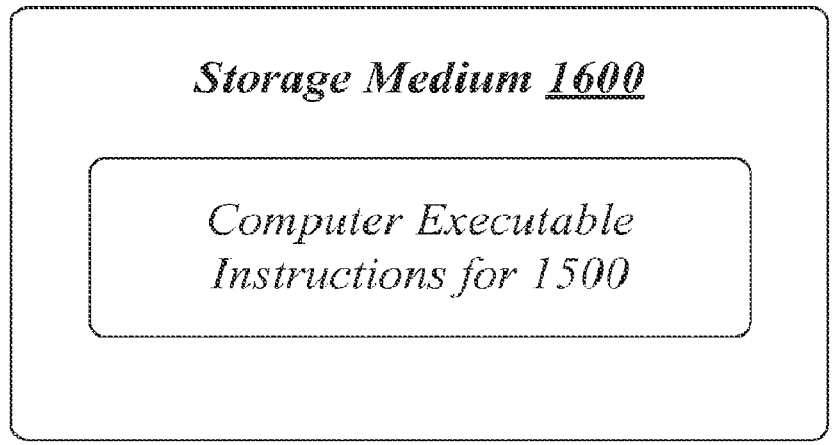
FIG. 16 illustrates an example of a storage medium.

FIG. 16 illustrates an example of a storage medium 1600. Storage medium 1600 may comprise an article of manufacture. In some examples, storage medium 1600 may include any non-transitory computer readable medium or machine readable medium, such as an optical, magnetic or semiconductor storage. Storage medium 1600 may store various types of computer executable instructions, such as instructions to implement logic flow 1500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 17:
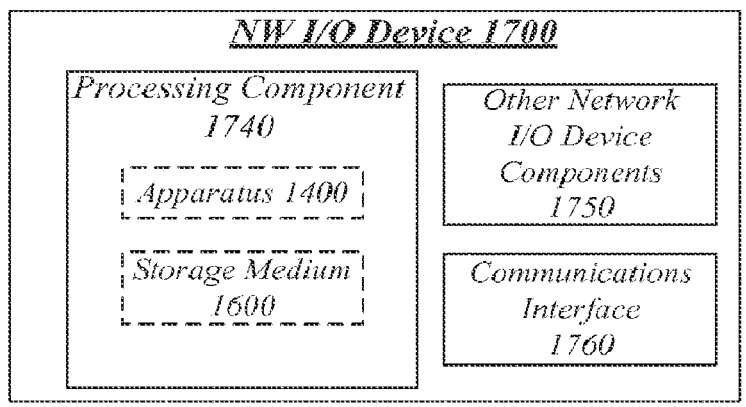
FIG. 17 illustrates an example network input/output device.

FIG. 17 illustrates an example NW I/O device 1700. In some examples, as shown in FIG. 17, NW I/O device 1700 may include a processing component 1740, other platform components or a communications interface 1760. According to some examples, network I/O device 1700 may be implemented in a NW I/O device coupled to a server in a system or data center as mentioned above.

According to some examples, processing component 1740 may execute processing operations or logic for apparatus 1400 and/or storage medium 1600. Processing component 1740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1750 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1760 may include logic and/or features to support a communication interface. For these examples, communications interface 1760 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1700 may be implemented using any combination of discrete circuitry, application specific integrated circuits (ASICs), logic gates and/or single chip architectures. Further, the features of NW I/O device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example apparatus may include circuitry for a network input/output device coupled to a server. The example apparatus may also include a receive module for execution by the circuitry to receive a command from a client remote to the server. The command may provide the client access to a storage device controlled by a Non-Volatile Memory Express (NVMe) controller maintained at the server. The example apparatus may also include a validation module for execution by the circuitry to validate the command based, at least in part, on whether an operation code (Opcode) indicated in the command is supported by the network input/output device and on whether an index identifier indicated in the command associates the client with an NVMe Namespace Identifier allocated to the client. The example apparatus may also include a report module for execution by the circuitry to indicate a status of the received command to the client. The status may include one of an invalid command or a completed command.

In some examples, the example apparatus may also include the network input/output device, the storage device and the NVMe controller being arranged to operate in compliance with an industry standard to include PCIe Base Specification, revision 3.0 or NVMe Specification, revision 1.1.

According to some examples for example apparatus, the command may be received in a packet compatible with a remote direct memory access (RDMA) protocol to include one of Internet Wide Area RDMA protocol (iWARP), Infinband or RDMA over Converged Ethernet (RoCE).

In some examples for the example apparatus, the Opcode included in the command including one of a flush, a write, a read, a write uncorrectable or a compare.

According to some examples, the example apparatus may also include the storage device including a hard disk drive (HDD) or a solid state drive (SSD). The SSD may have non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples for the example apparatus, the index identifier that associates the client with the Namespace Identifier is included in an index that indicates allocated resources provided to the client by the server for access to the storage device, the allocated resources to include a buffer maintained by the server and a first queue pair accessible to the client that includes a command submission queue to the NVMe controller and a command completion queue from the NVMe controller According to some examples for the example apparatus, the allocated resources may also include a second queue pair accessible to the NVMe controller that includes a second command submission queue to the NVMe controller and a second command completion queue from the NVMe controller.

In some examples, the example apparatus may also include the report module capable of indicating the status of the received command as a completed command via an indication in the first command completion queue that indicates the received command to access the storage device was executed by the NVMe controller.

According to some examples for the example apparatus, the allocated resources may include a portion of a memory capacity for the buffer. The validation module may also validate the command based on whether a transaction size to access the storage device indicated in the command exceeds the portion of the memory capacity.

In some examples for the example apparatus, the index identifier that associates the client with the NVMe Namespace Identifier may also associate the client with a first transaction context assigned to the buffer. The validation module may also validate the command based on whether a second transaction context indicated in the received command matches the first transaction context.

According to some examples for the example apparatus, the index identifier that associates the client with the NVMe Namespace Identifier may also associate the NVMe Namespace Identifier with an Opcode. The validation module may also validate the command based on whether the Opcode indicated in the command is associated with the NVMe Namespace Identifier.

In some examples, example methods may include receiving, at a network input/output device coupled to a server, a command for a client remote to the server to access a storage device controlled by a Non-Volatile Memory Express (NVMe) controller maintained at the server. The command may be validated based on whether an operation code (Opcode) indicated in the command is supported by the network input/output device and on whether an index identifier indicated in the command associates the client with an NVMe Namespace Identifier allocated to the client. A status of the received command may then be indicated to the client as one of an invalid command or a completed command.

According to some examples, the example methods may also include the network input/output device, the storage device and the NVMe controller being arranged to operate in compliance with an industry standard to include PCIe Base Specification, revision 3.0 or NVMe Specification, revision 1.1.

In some examples for the example methods, the allocated resources to also include a second queue pair accessible to the NVMe controller that includes a second command submission queue to the NVMe controller and a second command completion queue from the NVMe controller.

According to some examples for the example methods, the status of the received command may be indicated as a completed command via a completion indication placed in the first command completion queue. The completion indication may indicate that the received command to access the storage device was executed by the NVMe controller.

In some examples for the example methods, the index that associates the client with the NVMe Namespace Identifier may also associate the client with a first transaction context assigned to the buffer. Validating the command may also include validating the command based on whether a second transaction context indicated in the received command matches the first transaction context.

According to some examples for the example methods, the storage device to include a hard disk drive (HDD) or a solid state drive (SSD). For these examples, the SSD may have non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, at least one machine readable medium comprising a plurality of instructions that in response to being executed on a network input/output device coupled to a server cause the network I/O device to carry out the example method as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   processing circuitry configured to:
   communicate with a plurality of clients remote to the apparatus;
   allocate, to each client of the plurality of clients, a buffer, an input/output (I/O) queue pair comprising an I/O command submission queue and an I/O command completion queue, and a Non-Volatile Memory Express (NVMe) queue pair comprising an NVMe command submission queue and an NVMe command completion queue, operable to access storage controlled by an NVMe controller;
   exchange, using a network input/output (I/O) device, information with each of the clients of the plurality of clients using the I/O queue pair allocated to the client; and
   validate, using the network I/O device, commands received from one or more of the clients of the plurality of clients, wherein, upon successful validation of a command, the network I/O device communicates the command to the NVMe command submission queue, whereby the storage controller by the NVMe controller is not directly accessible to the plurality of clients.

2. The apparatus according to claim 1, wherein the processing circuitry is further configured to selectively provide each of the clients of the plurality of clients with access to the storage controlled by the NVMe controller.

3. The apparatus according to claim 2, wherein the commands are commands to access the storage.

4. The apparatus according to claim 1, wherein the network I/O device is operable to store a command received from a client of the plurality of clients in the buffer allocated to the client prior to validating the command.

5. The apparatus according to claim 1, wherein the network I/O device is operable to store command received from a client of the plurality of clients following validation of the command, but prior to communicating the command to the NVMe command submission queue, in the buffer allocated to the client.

6. The apparatus according to claim 1, wherein each of the clients of the plurality of clients can directly access the I/O queue pair allocated to that client.

7. The apparatus according to claim 1, wherein the processing circuitry is further configured to assign an NVMe namespace context to each of the clients.

8. The apparatus according to claim 1, wherein validating a command comprises, in part, comparing a memory capacity of the buffer allocated to the client with an amount of buffer memory requested or required by the command.

9. A method of operating an apparatus, the method comprising:

communicating with a plurality of clients remote to the apparatus;

allocating, to each client of the plurality of clients, a buffer, an input/output (I/O) queue pair comprising an I/O command submission queue and an I/O command completion queue, and a Non-Volatile Memory Express (NVMe) queue pair comprising an NVMe command submission queue and an NVMe command completion queue, operable to access storage controlled by an NVMe controller;

exchanging, using a network input/output (I/O) device, information with each of the clients of the plurality of clients using the I/O queue pair allocated to the client; and validating, using the network I/O device, commands received from one or more of the clients of the plurality of clients, wherein, upon successful validation of a command, the network I/O device communicates the command to the NVMe command submission queue, whereby the storage controller by the NVMe controller is not directly accessible to the plurality of clients.

10. The method according to claim 9, further comprising:
selectively providing each of the clients of the plurality of clients with access to the storage controlled by NVMe controller.

11. The method according to claim 10, wherein the commands are commands to access the storage.

12. The method according to claim 9, wherein the network I/O device is operable to store a command received from a client of the plurality of clients in the buffer allocated to the client prior to validating the command.

13. The method according to claim 9, wherein the network I/O device is operable to store command received from a client of the plurality of clients following validation of the command, but prior to communicating the command to the NVMe command submission queue, in the buffer allocated to the client.

14. The method according to claim 9, wherein each of the clients of the plurality of clients can directly access the I/O queue pair allocated to that client.

15. The method according to claim 9, further comprising:
assigning an NVMe namespace context to each of the clients.

16. The method according to claim 9, wherein validating a command comprises, in part, comparing a memory capacity of the buffer allocated to the client with an amount of buffer memory requested or required by the command.

17. A non-transitory computer-readable medium comprising instructions, which, when executed by processing circuitry coupled to the computer-readable medium, cause the processing circuitry to:

communicate with a plurality of clients remote to the processing circuitry;

allocate, to each client of the plurality of clients, a buffer, an input/output (I/O) queue pair comprising an I/O command submission queue and an I/O command completion queue, and a Non-Volatile Memory Express (NVMe) queue pair comprising an NVMe command submission queue and an NVMe command completion queue, operable to access storage controlled by an NVMe controller;

exchange, using a network input/output (I/O) device, information with each of the clients of the plurality of clients using the I/O queue pair allocated to the client; and validate, using the network I/O device, commands received from one or more of the clients of the plurality of clients, wherein, upon successful validation of a command, the network I/O device communicates the command to the NVMe command submission queue, whereby the storage controller by the NVMe controller is not directly accessible to the plurality of clients.

18. The non-transitory computer-readable medium according to claim 17, wherein the instructions, when executed by the processing circuitry, further cause the processing circuitry to selectively provide each of the clients of the plurality of clients with access to the storage controlled by the NVMe controller.

19. The non-transitory computer-readable medium according to claim 18, wherein the commands are commands to access the storage.

20. The non-transitory computer-readable medium according to claim 17, wherein the network I/O device is operable to store a command received from a client of the plurality of clients in the buffer allocated to the client prior to validating the command.

21. The non-transitory computer-readable medium according to claim 17, wherein the network I/O device is operable to store command received from a client of the plurality of clients following validation of the command, but prior to communicating the command to the NVMe command submission queue, in the buffer allocated to the client.

22. The non-transitory computer-readable medium according to claim 17, wherein each of the clients of the plurality of clients can directly access the I/O queue pair allocated to that client.

23. The non-transitory computer-readable medium according to claim 17, wherein the instructions, when executed by the processing circuitry, further cause the processing circuitry to cause the processing circuitry to assign an NVMe namespace context to each of the clients.

24. The non-transitory computer-readable medium according to claim 17, wherein validating a command comprises, in part, comparing a memory capacity of the buffer allocated to the client with an amount of buffer memory requested or required by the command.

* * * * *